United States Patent
Norrman et al.

(10) Patent No.: US 10,966,093 B2
(45) Date of Patent: Mar. 30, 2021

(54) TEMPORARY IDENTIFIER IN A WIRELESS COMMUNICATION SYSTEM

(71) Applicant: Telefonaktiebolaget LM Ericsson (publ), Stockholm (SE)

(72) Inventors: Karl Norrman, Stockholm (SE); Prajwol Kumar Nakarmi, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/329,472

(22) PCT Filed: Sep. 15, 2017

(86) PCT No.: PCT/EP2017/073278
§ 371 (c)(1),
(2) Date: Feb. 28, 2019

(87) PCT Pub. No.: WO2018/054777
PCT Pub. Date: Mar. 29, 2018

(65) Prior Publication Data
US 2019/0223018 A1 Jul. 18, 2019

Related U.S. Application Data

(60) Provisional application No. 62/397,234, filed on Sep. 20, 2016.

(51) Int. Cl.
*H04W 4/00* (2018.01)
*H04W 12/10* (2021.01)
(Continued)

(52) U.S. Cl.
CPC ......... *H04W 12/10* (2013.01); *H04L 63/0414* (2013.01); *H04W 8/08* (2013.01);
(Continued)

(58) Field of Classification Search
None
See application file for complete search history.

(56) References Cited

U.S. PATENT DOCUMENTS

| | | | |
|---|---|---|---|
| 2010/0002582 A1* | 1/2010 | Luft | H04W 74/0866 370/230.1 |
| 2012/0163300 A1* | 6/2012 | Wang | H04W 8/082 370/328 |
| 2013/0150035 A1* | 6/2013 | Chande | H04W 24/02 455/435.1 |

OTHER PUBLICATIONS

"3GPP TS 24.301 V13.6.1", 3rd Generation Partnership Project; Technical Specification Group Core Network and Terminals; Non-Access-Stratum (NAS) protocol for Evolved Packet System (EPS); Stage 3 (Release 13), Jun. 2016, pp. 1-452.

(Continued)

*Primary Examiner* — Zewdu A Beyen
(74) *Attorney, Agent, or Firm* — Murphy, Bilak & Homilier, PLLC

(57) ABSTRACT

A method is performed by a wireless device (16). The method comprises determining whether a core network functionality (12) of a wireless communication system (10) refreshes a temporary identifier (18) associated with the wireless device (16) in accordance with a defined procedure. The method also comprises, responsive to determining that the core network functionality (12) does not refresh the temporary identifier (18) in accordance with the defined procedure, performing one or more actions. The action(s) may for instance include recording at the wireless device (16) that the core network functionality (12) does not refresh a temporary identifier (18) in accordance with the defined procedure and/or reporting the core network functionality (12) as not refreshing the temporary identifier (18) in accordance with the defined procedure.

11 Claims, 14 Drawing Sheets

(51) Int. Cl.
*H04L 29/06* (2006.01)
*H04W 12/02* (2009.01)
*H04W 12/75* (2021.01)
*H04W 12/082* (2021.01)
*H04W 76/11* (2018.01)
*H04W 8/08* (2009.01)
*H04W 60/00* (2009.01)
*H04W 76/32* (2018.01)
*H04W 60/06* (2009.01)

(52) U.S. Cl.
CPC ......... *H04W 12/02* (2013.01); *H04W 12/082* (2021.01); *H04W 12/75* (2021.01); *H04W 60/00* (2013.01); *H04W 76/11* (2018.02); *H04W 60/06* (2013.01); *H04W 76/32* (2018.02)

(56) References Cited

OTHER PUBLICATIONS

"PCR to TR 33.899: Minimum security level assured by the UE", 3GPP TSG SA WG3 (Security) Meeting #83; S3-160830; San Jose del Cabo (Mexico), May 9-13, 2016, pp. 1-5.

"Privacy-enhanced LTE-style mechanism for temporary identifier assignment", 3GPP TSG-SA3 Meeting #85; S3-162109; Santa Cruz de Tenerife, Spain, Nov. 7-11, 2016, pp. 1-3.

"Refreshing CN short-term subscriber identifiers", 3GPP TSG-SA3 Meeting #85; S3-161858; Santa Cruz de Tenerife, Spain, Nov. 7-11, 2016, pp. 1-4.

Shaik, Altaf, et al., "Practical Attacks Against Privacy and Availability in 4G/LTE Mobile Communication Systems", NDSS '16; San Diego, CA; http://dx.doi.org/10.14722/ndss.2016.23236, Feb. 21-24, 2016, pp. 1-16.

* cited by examiner

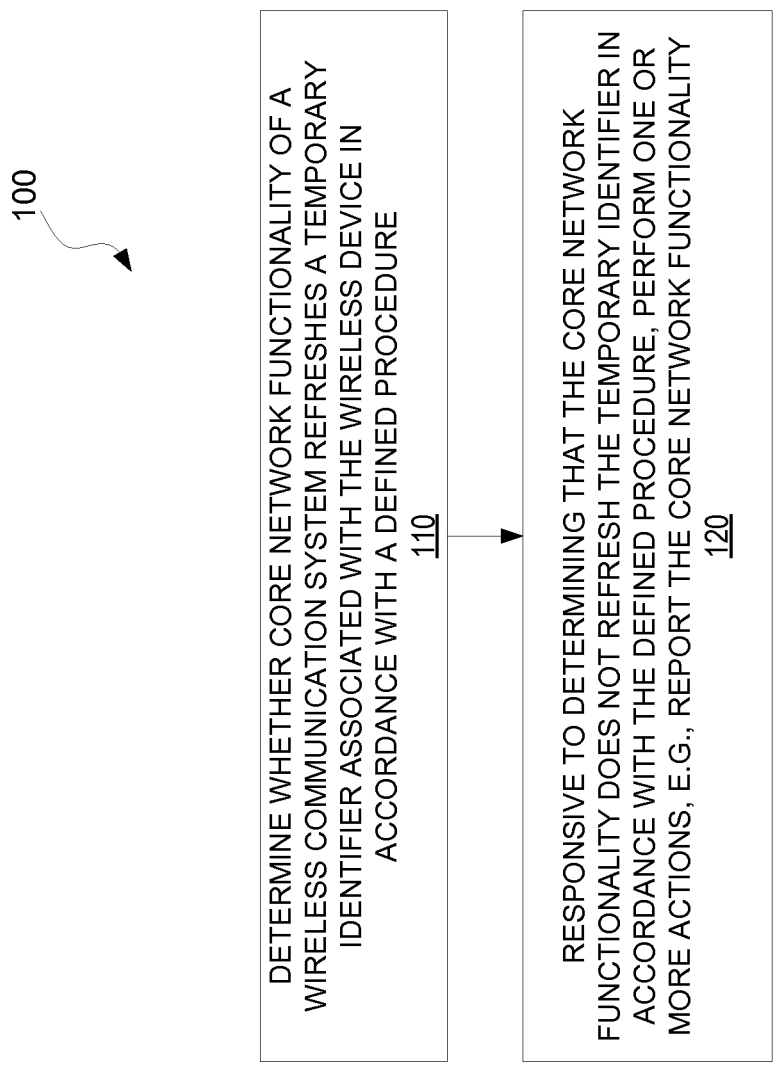

```
                    ┌─────────────────────────────┐
                    │ DETERMINE WHETHER CORE      │
                    │ NETWORK FUNCTIONALITY OF A  │
              200   │ WIRELESS COMMUNICATION      │
                ↘   │ SYSTEM PROVIDES ONE OR MORE │
                    │ FEATURES OF A FIRST CORE    │
                    │ NETWORK TYPE                │
                    │ 210                         │
                    └──────────────┬──────────────┘
                                   ↓
                    ┌─────────────────────────────┐
                    │ DETERMINE WHETHER THE CORE  │
                    │ NETWORK FUNCTIONALITY USES  │
                    │ AN IDENTIFIER ALLOCATION    │
                    │ PROCEDURE PROVIDED BY THE   │
                    │ FIRST CORE NETWORK TYPE IN  │
                    │ ORDER FOR THE WIRELESS      │
                    │ DEVICE TO OBTAIN A FRESH    │
                    │ TEMPORARY IDENTIFIER        │
                    │ 220                         │
                    └──────────────┬──────────────┘
                                   ↓
                    ┌─────────────────────────────┐
                    │ RESPONSIVE TO DETERMINING   │
                    │ THAT THE CORE NETWORK       │
                    │ FUNCTIONALITY PROVIDES ONE  │
                    │ OR MORE FEATURES OF THE     │
                    │ FIRST CORE NETWORK TYPE,    │
                    │ BUT DOES NOT USE THE        │
                    │ IDENTIFIER ALLOCATION       │
                    │ PROCEDURE PROVIDED BY THE   │
                    │ FIRST CORE NETWORK TYPE,    │
                    │ PERFORM ONE OR MORE ACTIONS │
                    │ 230                         │
                    └─────────────────────────────┘
```

FIG. 4

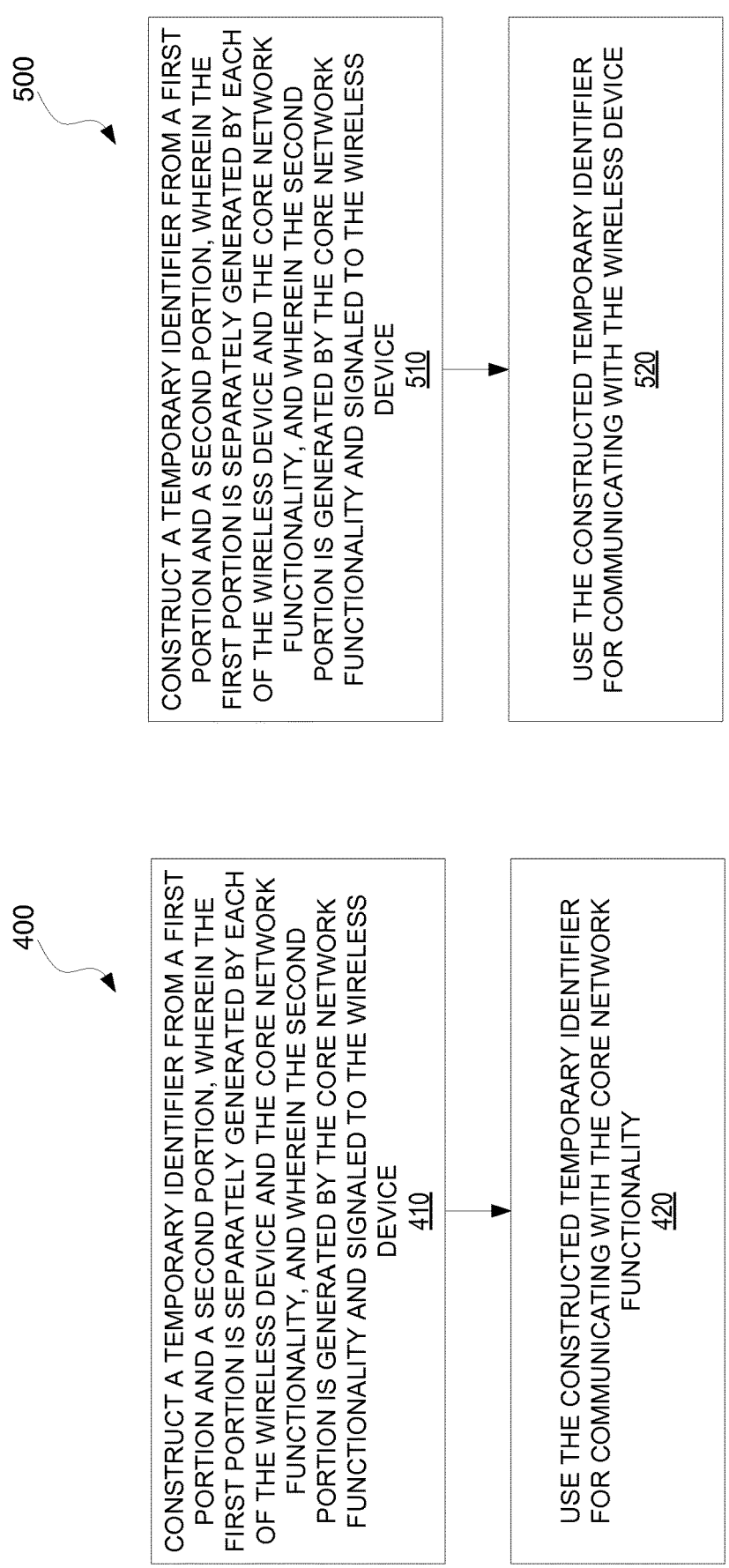

TEMPORARY IDENTIFIER IN A WIRELESS COMMUNICATION SYSTEM

RELATED APPLICATIONS

This application claims priority to U.S. Provisional Application Ser. No. 62/397,234 filed Sep. 20, 2016, the entire contents of which are incorporated herein by reference.

TECHNICAL FIELD

The present application relates generally to a wireless communication system, and more particularly to methods performed by a wireless device, and to wireless devices.

BACKGROUND

A wireless communication system uses identifiers (or identities) for various purposes. The system may for instance use an identifier to identify a user, a subscriber (or a universal subscriber identity module, USIM), a mobile equipment (ME) component of a wireless device (e.g., user equipment, UE), a wireless device as a whole (e.g., a combination of ME and USIM), or the like. An identifier in this regard may be unique, either locally or globally. Moreover, an identifier may be long-term (e.g., permanent) or short-term (i.e., x' temporary). For example, a Globally Unique Temporary Identifier (GUTI) uniquely and globally identifies a particular subscriber on a short-term basis.

A wireless communication system may use an identifier on a short-term or temporary basis as a way to bolster privacy or security. For example, threats to end user privacy are presently discovered and published at a high pace in daily newspapers, hacker conferences and leaked documents from government organizations. This is in particular the case for mobile systems where a number of publications show how a user's location can be tracked via the user's identifier transmitted between the phone and the mobile network. Specifically, the user's identifier which is long-term or permanent, called International Mobile Subscription Identifier (IMSI), is used by the core network as a stable and reliable identifier to identify the user. Malicious parties can passively or actively obtain the IMSI using a radio receiver/transmitter in the vicinity of the user. To mitigate such attacks, mobile networks allocate temporary identifiers to users. The frequency with which the user's temporary identifiers are refreshed or updated determines the level of user's privacy this mechanism provides. For example, if the user's temporary identifier is not refreshed or updated for a long time, the user's location can be tracked by observing the user's temporary identifier being transmitted in different locations.

Consider an example of an allocation procedure in the setting of Long Term Evolution (LTE) mobile networks (the basic structure is essentially the same in $2^{nd}$ Generation (2G) and $3^{rd}$ Generation (3G) mobile networks). When the user equipment (UE) runs an initial procedure with the Mobility Management Entity (MME) in the core network, the UE includes its identifier. This identifier may be either an IMSI or a GUTI. In a response message, the MME may assign a new GUTI to the UE. Since these response messages are encrypted, an attacker will not be able to get hold of the new GUTI when it is transmitted over the air.

FIG. 1 depicts identifier allocation or assignment in the context of the Attach procedure in LTE. As shown, the UE transmits an ATTACH REQUEST message to the MME and includes in the ATTACH REQUEST message an identifier (ID) (Step 1). This ID may be the UE's IMSI or may be a GUTI, e.g., if the UE and MME have previously engaged in communication (Step 0) whereby the MME has already allocated a GUTI to the UE before. After optionally engaging in a security mode control procedure (Step 2), the MME assigns or allocates a new GUTI to the UE (Step 3). The GUTI may be allocated for the first time or may be reallocated depending on if the UE sent the ATTACH REQUEST message using an IMSI or an existing GUTI respectively. The MME then transmits an ATTACH ACCEPT message to the UE and includes in the ATTACH ACCEPT message the newly assigned GUTI (Step 4).

Although exemplified as being included in the ATTACH ACCEPT message in FIG. 1, the MME may allocate or reallocate a new GUTI to a UE in any of the following messages:

ATTACH ACCEPT: The MME either allocates the GUTI for the first time or optionally reallocates the GUTI depending upon if the UE sent an ATTACH REQUEST using an IMSI or an existing GUTI respectively.
  TRACKING AREA UPDATE ACCEPT: The MME optionally reallocates the GUTI.
  GUTI REALLOCATION COMMAND: The MME explicitly reallocates the GUTI.

The MME thus has the opportunity to update the temporary identifier at several occasions.

Should, for some reason, the same temporary identifier be assigned to multiple UEs, the mobile network (represented by e.g. a node like MME in LTE) will assume that the temporary identifier is only associated with the UE that received it last. These UEs, on the other hand, will all consider themselves to be the sole owner of the temporary identifier. This situation can occur, e.g., in the situation that one UE is immobile but powered off for a time that is sufficiently long for the mobile network to clean out the association between the temporary identifier and the UE from its database.

Assignments of the same temporary identifiers to multiple UEs can lead to a number of error situations. Consider, for example, the case when one of the UEs, which the mobile network does not associate with the multiply assigned temporary identifier, connects to the mobile network and presents the temporary identifier. The mobile network will mistake the connecting UE for the UE currently associated with the temporary identifier. Consequently, the mobile network will use the integrity protection and encryption keys associated with that UE as well and, as a result, messages between the connecting UE and the mobile network will fail both integrity protection and be decrypted to rubbish.

Mismatching cryptographic keys would lead to a lock-out situation for the UE unless there were recovery mechanisms in place. Such mechanisms may comprise the UE re-attempting the connection a number of times and finally falling back to re-attaching using its long-term identifier. These kinds of mechanisms can take many seconds and each transmitted message consumes battery power from UEs—power that can be very scarce for small sensors.

Especially in the face of challenges associated with identifier collision, a mobile network (e.g. a node like MME in LTE) in known approaches decides on its own, when and if at all to reallocate a temporary identifier. This leaves open the possibility that a poorly implemented or configured network will keep the temporary identifier the same for a long time. In fact, LTE mobile networks have been observed to not change the GUTI for a UE for up to three days, even when the UE was moving within a city. In these cases, the location of the UE may be leaked.

SUMMARY

A wireless device according to some embodiments herein itself monitors whether core network functionality actually refreshes the device's temporary identifier, e.g., as the core network functionality is supposed to in accordance with a defined procedure. The wireless device thereby does not naively rely on or blindly trust the core network functionality to refresh its temporary identifier to the extent that it is supposed to, but effectively polices the core network functionality's compliance with temporary identifier refreshment procedures. If the core network functionality does not refresh the temporary identifier, the wireless device may perform certain action(s). The action(s) may for instance aim to mitigate the threat to the privacy or security of the wireless device and/or its user/subscriber attributable to refreshment failure, and/or aim to incentivize the core network functionality to begin refreshing temporary identifiers as it is supposed to. These and other embodiments may thereby safeguard the privacy or security of the wireless device and/or its user/subscriber, e.g., by protecting the location of the wireless device from being leaked.

More particularly, embodiments herein include a method performed by a wireless device. The method comprises determining whether a core network functionality of a wireless communication system refreshes a temporary identifier associated with the wireless device in accordance with a defined procedure. The method also comprises, responsive to determining that the core network functionality does not refresh the temporary identifier in accordance with the defined procedure, performing one or more actions. The one or more actions include one or more of: disconnecting from the core network functionality; refraining from communicating with the core network functionality over a user plane; terminating or refraining from any service that the wireless device is receiving, or would have received, from the core network functionality; recording at the wireless device that the core network functionality does not refresh a temporary identifier in accordance with the defined procedure; or reporting the core network functionality as not refreshing the temporary identifier in accordance with the defined procedure. As these examples demonstrate, the one or more actions may for instance be to the detriment of the core network functionality and/or the wireless device.

In some embodiments, the defined procedure is a procedure defined in a 5G wireless communication system for refreshing a temporary identifier associated with a wireless device. In one or more embodiments, for instance, the method may further comprise determining whether the core network functionality provides one or more features of a certain core network type (3.g., 5G), wherein the defined procedure is a procedure by which the certain core network type refreshes the temporary identifier. In some embodiments, the determining in the method comprises detecting whether a new temporary identifier signaled by the core network functionality to the wireless device is fresh with respect to a previously signaled temporary identifier. Alternatively, the determining may comprise detecting whether the core network functionality signals an updated temporary identifier to the wireless device within a time window since signaling a previous temporary identifier or whether the core network functionality signals an updated temporary identifier to the wireless device in association with a particular procedure.

Other embodiments herein include a method performed by a wireless device. The method comprises determining whether core network functionality of a wireless communication system provides one or more features of a certain core network type (e.g., a 5G core network). The method also comprises determining whether the core network functionality uses an identifier allocation procedure provided by the certain core network type in order for the wireless device to obtain a fresh temporary identifier. The method further entails, responsive to determining that the core network functionality provides one or more features of the certain core network type, but does not use the identifier allocation procedure provided by the certain core network type, performing one or more actions. The one or more actions may include one or more of: disconnecting from the core network functionality; refraining from communicating with the core network functionality over a user plane; terminating or refraining from any service that the wireless device is receiving, or would have received, from the core network functionality; recording at the wireless device that the core network functionality does not use the identifier allocation procedure provided by the certain core network type (e.g., even though the core network functionality provides one or more features of the certain core network type); or reporting the core network functionality as not using the identifier allocation procedure provided by the certain core network type (e.g., even though the core network functionality provides one or more features of the certain core network type). As these examples demonstrate, the one or more actions may for instance be to the detriment of the core network functionality and/or the wireless device.

In some embodiments, the certain core network type is a 5G core network.

In some embodiments, the wireless device determines whether the core network functionality uses an identifier allocation procedure provided by the certain core network type in order for the wireless device to obtain a fresh temporary identifier by determining whether the core network functionality supports, or advertises support for, the identifier allocation procedure provided by the certain core network type. Alternatively, the wireless device determines whether the core network functionality uses an identifier allocation procedure provided by the certain core network type in order for the wireless device to obtain a fresh temporary identifier by detecting whether a new temporary identifier signaled by the core network functionality to the wireless device is fresh with respect to a previously signaled temporary identifier. In still other embodiments, the wireless device determines whether the core network functionality uses an identifier allocation procedure provided by the certain core network type in order for the wireless device to obtain a fresh temporary identifier by detecting whether the core network functionality signals an updated temporary identifier to the wireless device within a time window since signaling a previous temporary identifier or whether the core network functionality signals an updated temporary identifier to the wireless device in association with a particular procedure. In any of the above embodiments, determining whether core network functionality of a wireless communication system provides one or more features of a certain core network type may comprise determining whether the core network functionality uses or supports a radio configuration parameter associated with the certain core network type. Alternatively or additionally, determining whether core network functionality of a wireless communication system provides one or more features of a certain core network type may comprise determining whether the core network functionality uses or supports procedures or message types associated with the certain core network type. In still other embodiments, determining whether core network functionality of a wireless communication system provides one or more features of a certain core network type may alternatively or additionally comprise determining whether a radio access network of the wireless communication system uses or supports identifiers associated with the certain core network type. Alternatively or additionally, determining whether core network functionality of a wireless communication system provides one or more features of a certain core network type may comprise determining whether a radio access network of the wireless communication system uses or supports broadcast messages or broadcast message fields associated with the certain core network type. In yet other embodiments, determining whether core network functionality of a wireless communication system provides one or more features of a certain core network type may alternatively or additionally comprise determining whether a radio access network of the wireless communication system uses or supports protocols, procedures, and/or message types associated with the certain core network type.

In some embodiments, the procedure is a procedure in which the core network functionality assigns and transmits the temporary identifier to the wireless device.

In any of above embodiments, the one or more actions may include said recording.

Alternatively or additionally, he one or more actions may include said reporting.

Note that the temporary identifier in any of the above embodiments may identify the wireless device in some embodiments (e.g., in terms of a combination of a mobile equipment, ME, and USIM). In other embodiments, the temporary identifier may identifier a user of the wireless device or a user subscription module of the wireless device (e.g., the temporary identifier is a temporary subscriber identifier). Alternatively or additionally, the temporary identifier may identifier a mobile equipment component of the wireless device.

Embodiments herein further include corresponding apparatus, computer programs, carriers, computer program products, and the like as detailed herein.

For example, embodiments herein include a wireless device configured to determine whether a core network functionality of a wireless communication system refreshes a temporary identifier associated with the wireless device in accordance with a defined procedure. The wireless device may also be configured, responsive to determining that the core network functionality does not refresh the temporary identifier in accordance with the defined procedure, to perform the one or more actions above.

Embodiments herein also include a wireless device configured to determine whether core network functionality of a wireless communication system provides one or more features of a certain core network type (e.g., a 5G core network). The wireless device is also configured to determine whether the core network functionality uses an identifier allocation procedure provided by the certain core network type in order for the wireless device to obtain a fresh temporary identifier. The wireless device is further configured to, responsive to determining that the core network functionality provides one or more features of the certain core network type, but does not use the identifier allocation procedure provided by the certain core network type, perform the one or more actions above.

BRIEF DESCRIPTION OF THE DRAWINGS

FIG. 3 is a logic flow diagram of a method performed by a wireless device according to some embodiments.

FIG. 4 is a logic flow diagram of a method performed by a wireless device according to other embodiments.

FIG. 7 is a logic flow diagram of a method performed by a wireless device according to some embodiments.

FIG. 8 is a logic flow diagram of a method performed by core network functionality according to some embodiments.

DETAILED DESCRIPTION

Figure 1:
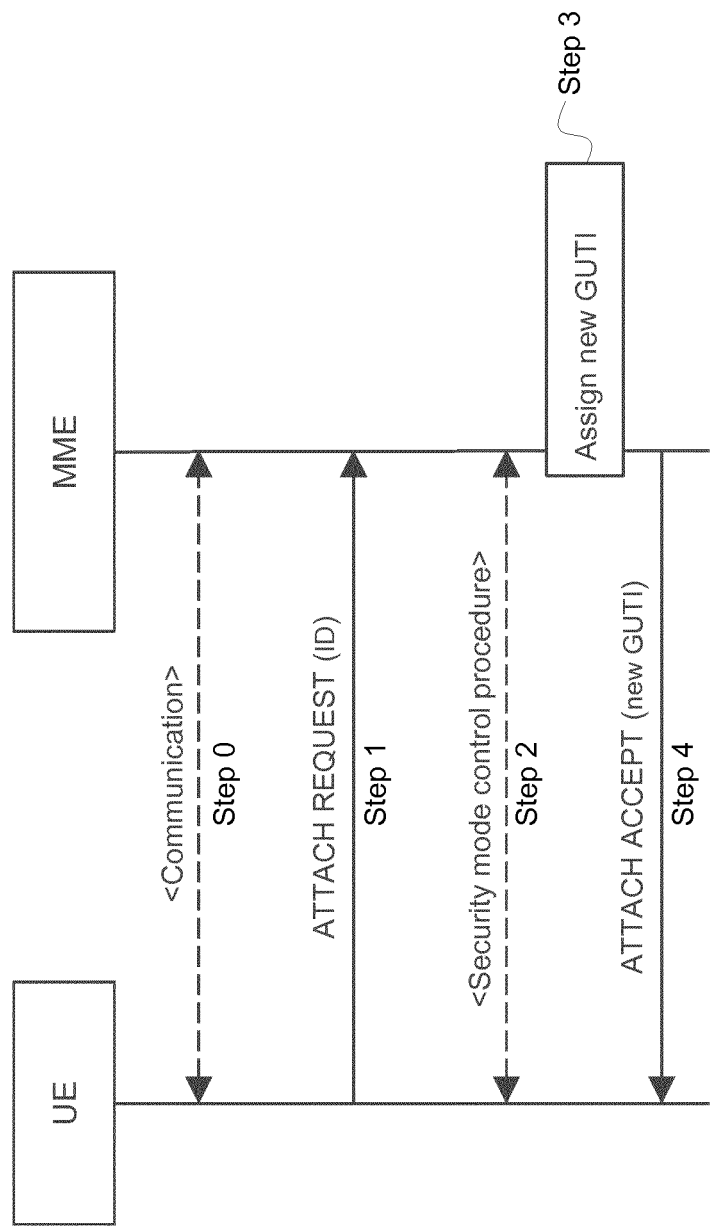
FIG. 1 is a call flow diagram of a procedure for assigning a temporary identifier in an attach procedure in a Long Term Evolution (LTE) system.
Figure 2:
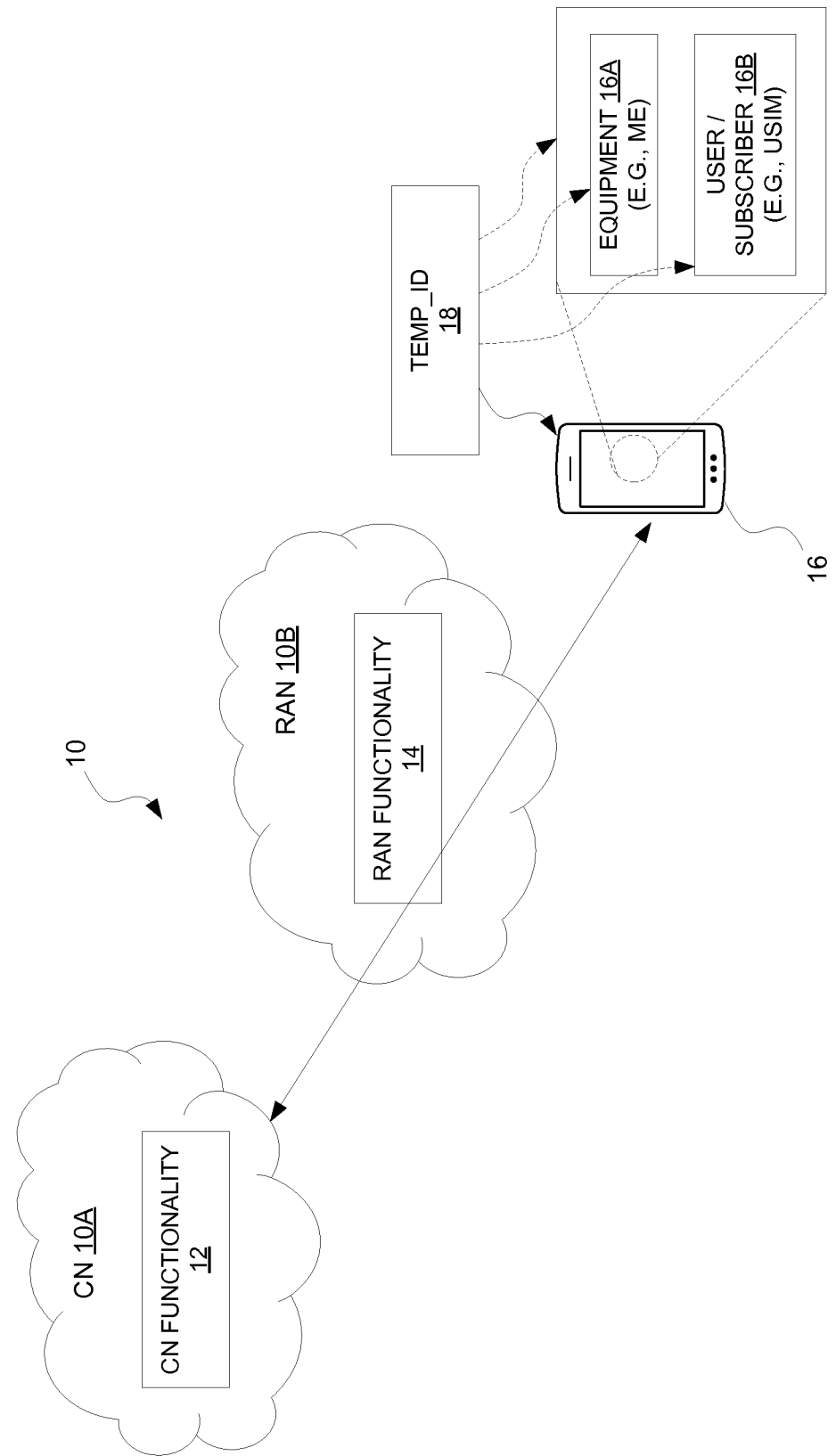
FIG. 2 is a block diagram of a wireless communication system that includes a wireless device and core network functionality according to some embodiments.

FIG. 2 illustrates a wireless communication system 10 according to some embodiments. As shown, the system 10 includes a core network (CN) 10A with CN functionality 12 as well as a radio access network (RAN) 10B with RAN functionality 14. Core network functionality 12 may be implemented by network equipment in the CN 10A, e.g., deployed at one or more core network nodes. Core network functionality 12 may include for instance functionality for handling session management and/or functionality for handling mobility management. Core network functionality 12 in this and other cases may be performed by one or more functions, e.g., at the same or different core network node. Similarly, radio access network functionality 14 may be implemented by network equipment in the RAN 10B, e.g., deployed at one or more radio network nodes. Radio access network functionality 14 in this and other cases may be performed by one or more functions, e.g., at the same or different radio network node.

The system 10 also includes a wireless device 16, such as a user equipment (UE). In some embodiments, the wireless device 16 comprises multiple components 16A and 16B which are logically, functionally, or physically associated with the device's equipment and the device's user or subscriber, respectively. In some embodiments, the device's equipment 16A may be represented as a Mobile Equipment (ME), whereas the device's user or subscriber 16B may be associated with the wireless device 16 via a Universal Subscriber Identity Module (USIM). Such a USIM which may be modular with respect to the ME (e.g., removable from the ME).

The wireless device 16 in this regard may be associated with a temporary identifier 18. This temporary identifier 18 may for example identify a user or subscriber 22 of the wireless device 16, e.g., by identifying a USIM associated with the device 16. Alternatively, the temporary identifier 18 may identify the device's equipment 16A, e.g., by identifying a ME associated with the device 16. In other embodiments, the identifier 18 may identify the wireless device 16 as a whole, e.g., by identifying a combination of ME and USIM. No matter the particular manner in which the temporary identifier 18 is associated with the device 16, the identifier 18 may be temporary in nature in the sense that it is to be updated or refreshed on a more frequent basis than one or more other long-term identifiers used in the system 10. The temporary identifier 18 may for instance be a Globally Unique Temporary Identifier (GUTI) that uniquely and globally identifies a particular subscriber on a short-term basis, as contrasted with an International Mobile Subscription Identifier (IMSI) which is used by the system 10 as a more long-term subscriber identifier.

In some embodiments, the core network functionality 12 controls if and when the temporary identifier 18 is refreshed. For example, in one or more embodiments, the core network functionality 12 (unilaterally) assigns the temporary identifier 18 and signals that identifier 18 to the wireless device 16. Especially where refreshment of the temporary identifier 12 is controlled by the core network functionality 12, the privacy or security of the wireless device 16 and/or its user/subscriber may be threatened if the core network functionality 12 is poorly implemented or configured, e.g., so as to not refresh the temporary identifier 18 often enough to thwart malicious tracking attempts.

In these and other contexts, the wireless device 16 according to some embodiments herein itself monitors whether the core network functionality 12 actually refreshes its temporary identifier 18, e.g., as the core network functionality 12 is supposed to in accordance with a defined procedure. That is, the wireless device 16 does not naively rely on or blindly trust the core network functionality 12 to refresh its temporary identifier 18 to the extent that it is supposed to, but effectively polices the core network functionality's compliance with temporary identifier refreshment procedures. If the core network functionality 12 does not refresh the temporary identifier 18, the wireless device 16 may perform certain action(s). The action(s) may for instance aim to mitigate the threat to the privacy or security of the wireless device 16 and/or its user/subscriber attributable to refreshment failure, and/or aim to incentivize the core network functionality 12 to begin refreshing temporary identifiers as it is supposed to. These and other embodiments may thereby safeguard the privacy or security of the wireless device 16 and/or its user/subscriber, e.g., by protecting the location of the wireless device 16 from being leaked.

FIG. 3 in this regard illustrates a method 100 performed by the wireless device 16 according to some embodiments. As shown, the method 100 includes determining whether the core network functionality 12 refreshes the temporary identifier 18 associated with the wireless device 16 in accordance with a defined procedure (e.g., a procedure defined to require the temporary identifier 18 to be updated at certain times, events, or protocol procedures) (Block 110). In some embodiments, for example, the wireless device 16 detects whether a new temporary identifier signaled by the core network functionality 12 to the wireless device 16 is fresh with respect to a previously signaled temporary identifier, e.g., by comparing the identifiers. In other embodiments, the wireless device 16 detects whether the core network functionality 12 signals an updated temporary identifier to the wireless device 16 within a time window since signaling a previous temporary identifier or whether the core network functionality 12 signals an updated temporary identifier to the wireless device 16 in association with a particular procedure (e.g., an attachment procedure, a tracking area update procedure, etc.).

Regardless, the method 100 as shown further includes, responsive to determining that the core network functionality 12 does not refresh the temporary identifier 18 in accordance with the defined procedure, performing one or more actions (Block 120). In some embodiments, the action(s) include the wireless device 16 disconnecting from or otherwise limiting its functionality with respect to the core network functionality 12. The device 16 may for instance terminate or refrain from (i.e., forego) any service that the device 16 is or would have received from the core network functionality 12, e.g., in favor of user privacy. Alternatively or additionally, the action(s) include the wireless device 16 refraining from communicating with the core network functionality 12 over a user plane. In still other embodiments, the action(s) include recording at the wireless device 12 that the core network functionality 12 does not refresh the temporary identifier 18 in accordance with the defined procedure and/or reporting the core network functionality 12 (e.g., to a forum that makes the report public) as not refreshing the temporary identifier 18 in accordance with the defined procedure. For example, the wireless device 12 may report the core network functionality 12 as providing one or more features of the certain core network type but not using an identifier allocation procedure provided by that core network type.

As these examples illustrate, the action(s) in some embodiments may even be to the detriment of the core network functionality 12 and/or the wireless device 16, e.g., in the sense that the effect of the action(s) directly or indirectly causes detriment to the core network functionality 12 and/or the wireless device 16. This detriment may be realized for example in terms of detriment (at any time, now or in the future) to a service provided by the core network functionality 12 (e.g., to the wireless device 16 or to one or more other wireless devices). Where the action(s) cause detriment to the wireless device 16 itself, the action(s) are in a sense self-detrimental to the device 16. Regardless of whether the action(s) are deemed detrimental, though, the action(s) may ultimately aim to mitigate the threat to the privacy or security of the wireless device 16 and/or its user/subscriber attributable to refreshment failure, and/or aim to incentivize the core network functionality 12 to begin refreshing temporary identifiers as it is supposed to.

In the context of 5G, for instance, a new non-access stratum (NAS) protocol for 5G may mandate that the core network functionality 12 re-assign the temporary identifier 18 for the wireless device 16 at certain events, e.g., tracking area update procedure runs, attach procedure runs, idle-to-connected transitions, or idle-to-active transitions. If the device 16 does not get assigned a new temporary identifier 18 at these occasions, the device 16 may perform the above action(s) such as by disconnecting from the network or limiting its functionality in some other way. Optionally, the device 16 also remembers one or more of the previously temporary identifiers it has been assigned and compares the newly assigned temporary identifier 18 to these. If the device 16 notices that it has been assigned the same temporary identifier previously within some window, e.g., a window containing the five last temporary identifiers, the device 16 will similarly perform the above action(s) such as by limiting its functionality in some way.

FIG. 4 illustrates still one or more other embodiments herein whereby the wireless device 16 may perform the action(s) described above. In particular, FIG. 4 illustrates a method 200 performed by the wireless device 16. The method 200 includes determining whether core network functionality 12 of a wireless communication system 10 provides one or more features of a certain core network type (e.g., a 5G core network type) (Block 210). The method 200 also includes determining whether the core network functionality 12 uses an identifier allocation procedure provided by the certain core network type in order for the wireless device 16 to obtain a fresh temporary identifier (Block 220). The method 200 further includes, responsive to determining that the core network functionality 12 provides one or more features of the certain core network type, but does not use the identifier allocation procedure provided by the certain core network type, performing one or more actions (Block 230). The action(s) may include any of those described above, e.g., with respect to FIG. 3. In some embodiments, therefore, the wireless device 16 may effectively perform the action(s) above if the core network functionality 12 does not use a certain identifier allocation procedure.

Consider an example in which the identifier allocation procedure is a procedure in which the core network functionality 12 assigns and transmits the temporary identifier 18 to the wireless device 16. In this case, the wireless device 16 may determine whether the core network functionality 12 uses an identifier allocation procedure provided by the certain core network type in order for the wireless device 16 to obtain a fresh temporary identifier by detecting whether a new temporary identifier signaled by the core network functionality 12 to the wireless device 16 is fresh with respect to a previously signaled temporary identifier. Alternatively or additionally, the wireless device 16 may determine whether the core network functionality 12 uses an identifier allocation procedure provided by the certain core network type in order for the wireless device 16 to obtain a fresh temporary identifier by detecting whether the core network functionality 12 signals an updated temporary identifier to the wireless device 16 within a time window since signaling a previous temporary identifier or whether the core network functionality 12 signals an updated temporary identifier to the wireless device 16 in association with a particular procedure. In these and other embodiments, for example, the wireless device 16 may effectively track or monitor whether the core network functionality 12 actually refreshes its temporary identifier, e.g., as it is supposed to in accordance with the identifier allocation procedure provided by the certain core network type, and perform the action(s) upon the core network functionality's failure to do so.

In other embodiments, the wireless device 16 performs the action(s) above if the core network functionality 12 does not use a certain identifier allocation procedure with the wireless device 16 and/or with any other wireless device. For example, the wireless device 16 in some embodiments may determine that the core network functionality 12 does not use this identifier allocation procedure (with it or any other wireless device) if the device 16 determines that the core network functionality 12 does not even support, or advertise support of, that identifier allocation procedure. In one or more embodiments, therefore, the wireless device 16 may determine whether the core network functionality 12 uses the identifier allocation procedure provided by the certain core network type by determining whether the core network functionality 12 supports, or advertises support for, the identifier allocation procedure provided by the certain core network type.

Note in this regard that different types of core network functionality may provide different types of identifier allocation procedures. In some embodiments, for example, 5th Generation (5G) core network functionality may provide an identifier allocation procedure whereby the core network functionality and a wireless device each separately generate the temporary identifier 18, e.g., so that if either side fails to refresh generation of the temporary identifier 18 within a defined timeframe or in association with a defined procedure, the two sides are unable to communicate. By contrast, pre-5G core network functionality may provide an identifier allocation procedure whereby the core network functionality (unilaterally) assigns the temporary identifier 18 and signals that identifier to the wireless device 16, e.g., meaning that the core network functionality has more control regarding if and when the temporary identifier 18 is refreshed.

These and other embodiments herein may guard against core network functionality 12 selectively providing only some features of a certain type of core network (e.g., certain 5G core network features, such as network slicing, that directly affect business so as to benefit the core network operator), but not providing other features of that core network type (e.g., a 5G identifier allocation procedure that benefits the wireless device 16 and/or its user/subscriber, e.g., in terms of privacy or security). Indeed, the core network functionality 12 could avoid the temporary identifier refresh feature by re-using an older, legacy procedure or message types (e.g., as in LTE), in order to reduce development costs or to save signaling and service setup time. For example, in some embodiments, the wireless device 16 may perform the action(s) simply upon recognizing that the core network functionality 12 only advertises support for a pre-5G identifier allocation procedure (i.e., it does not advertise support for a 5G identifier allocation procedure), even though the core network functionality 12 provides one or more 5G features. More generally, then, the wireless device 16 in some embodiments may perform the action(s) responsive to determining that the core network functionality 12 provides one or more features of a first core network type (e.g., 5G) and determining that the core network functionality 12 uses an identifier allocation procedure provided by a second core network type (e.g., pre-5G), instead of an identifier allocation procedure provided by the first core network type.

In this sense, the wireless device in some embodiments herein seeks to effectively enforce a requirement or mandate that any core network functionality which provides one or more features of a first core network type (e.g., 5G) must also use an identifier allocation procedure provided by that first core network type (e.g., a 5G identifier allocation procedure). For example, the wireless device 16 may make sure that the implementation or configuration of the core network functionality does not avoid temporary identifier refresh (e.g., by implementing an identifier allocation procedure of a second core network type).

Figure 5:
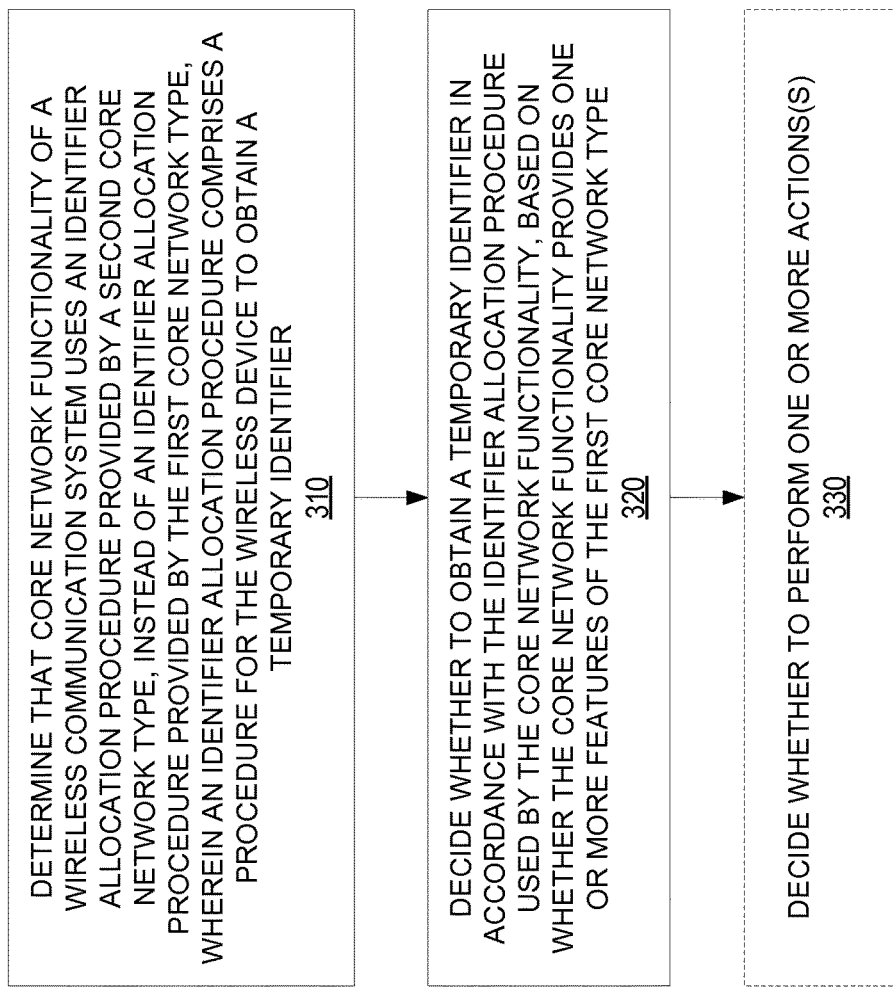
FIG. 5 is a logic flow diagram of a method performed by a wireless device according to still other embodiments.

FIG. 5 shows a method 300 performed by the wireless device 16 according to one or more other embodiments in this regard. The wireless device 16 is configured for operation in a wireless communication system with a first core network type (e.g., a 5G core network). The method 300 comprises determining that core network functionality 12 uses an identifier allocation procedure provided by a second core network type (e.g., a pre-5G core network), instead of an identifier allocation procedure provided by the first core network type (Block 310). The identifier allocation procedure in this regard is a procedure for the wireless device 16 to obtain a temporary identifier 18 (e.g., a Globally Unique Temporary Identifier, GUTI). The temporary identifier may identify the device itself, a user or subscriber associated with the device, a subscriber identity module associated with the device, or any combination thereof. In any event, the method 300 also comprises deciding whether to obtain a temporary identifier 18 in accordance with the identifier allocation procedure used by the core network functionality 12, based on whether the core network functionality 12 provides one or more features of the first core network type (Block 320).

In some embodiments, for example, the wireless device 16 chooses to obtain a temporary identifier 18 in accordance with the identifier allocation procedure used by the core network functionality 12 if the core network functionality 12 does not provide one or more features of the first core network type. Alternatively or additionally, the wireless device 16 may choose not to obtain a temporary identifier 18 in accordance with the identifier allocation procedure used by the core network functionality 12 if the core network functionality 12 does provide one or more features of the first core network type.

For example, the wireless device 16 may choose to obtain a GUTI in accordance with a pre-5G identifier allocation procedure only if the core network functionality 12 does not provide one or more 5G core network features. In this way, the wireless device 16 may insist on using a 5G identifier allocation procedure if the core network functionality 12 provides any 5G features, e.g., so as to effectively deter core network functionality 12 from selectively implementing only those 5G features that benefit the core network (operator) while ignoring other 5G features (like a 5G identifier allocation procedure) that benefit the device 16 or the device's user (in terms of user privacy). A 5G identifier allocation procedure may for instance require that the GUTI or other TEMP_ID be generated separately at both the device side and the core network side, so that if any one decides not to do so for refreshing the TEMP_ID, the communication breaks.

Note that in any of the above embodiments, the wireless device 16 may independently assess whether the core network functionality 12 provides one or more features of a certain core network type. For example, the wireless device 16 may independent assess whether the core network functionality 12 provides one or more features of the first core network type, irrespective of whether signaling from the core network functionality 12 indicates the core network functionality 12 uses the identifier allocation procedure provided by the second core network type. The wireless device 16 may for example refrain from simply and naively using whatever identifier allocation procedure the core network functionality 12 indicates it uses or supports, and instead effectively evaluate what identifier allocation procedure the core network functionality 12 should use or support in view of which other features the core network functionality 12 provides. If for example the core network functionality 12 provides some 5G features, the wireless device 16 deduces it should also provide a 5G identifier allocation procedure.

Figure 6:
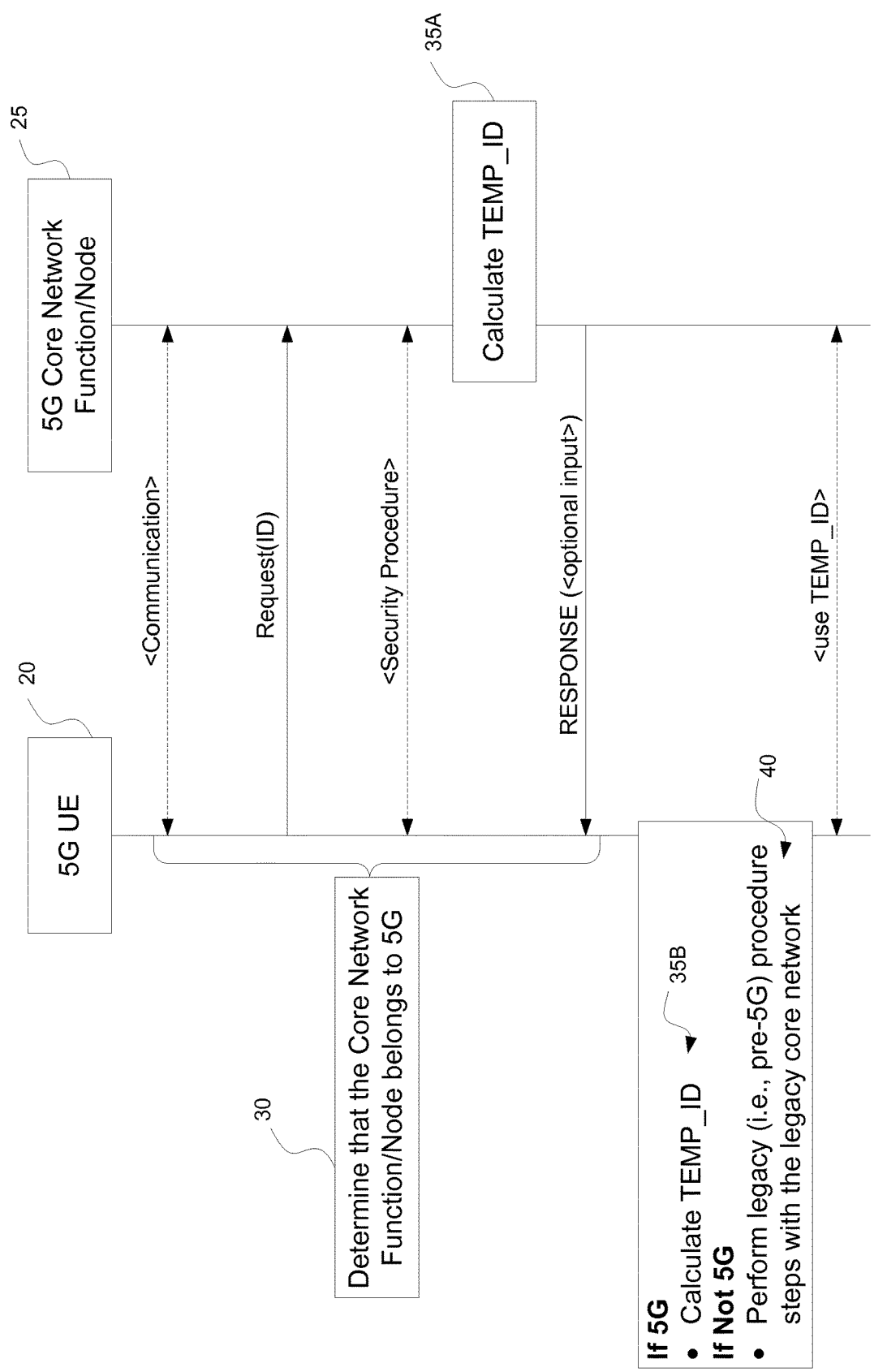
FIG. 6 is a call flow diagram for a wireless device to obtain a temporary identifier according to one or more embodiments.

Consider for instance embodiments by which the wireless device 16 may determine whether core network functionality 12 provides one or more 5G features (e.g., so as to be deemed a 5G core network, even if only in part). FIG. 6 illustrates one or more embodiments in this regard. As shown, the wireless device 16 in the form of a 5G UE 20 first determines whether a core network function or node 25 belongs to a 5G type of network (e.g., based on the core network function or node 25 providing one or more 5G features) (Block 30). If the UE 20 determines the core network function or node 25 belong to 5G, then the UE 20 and the core network function or node 25 each generates a next temporary identifier TEMP_ID in accordance with a 5G identifier allocation procedure, e.g., by using a common function and common parameters known to the two parties as described more fully below (Blocks 35A and 35B). The generated temporary identifier TEMP_ID will be used the next time when necessary. The UE 20 does not perform legacy procedure with a 5G core network. On the other hand, if the UE 20 determines that the core network function or node 25 belongs to a pre-5G network, the UE 20 may perform a legacy identifier allocation procedure (e.g., a pre-5G procedure) (Block 40). For example, if the core network function or node 25 only provides pre-5G features, the UE 20 may correspondingly perform a pre-5G identifier allocation procedure. But if the core network function or node 25 provides one or more 5G features, the UE 20 may insist on performing a 5G identifier allocation procedure. In this way, neither implementations nor configurations in the 5G core network can avoid the refreshment of the temporary identifier TEMP_ID, thereby enhancing the user's privacy.

In any of the above embodiments, the wireless device 16 can determine whether core network functionality 12 provides one or more features of a certain core network type (e.g., 5G) using any number of mechanisms. In some embodiments, for instance, the wireless device 16 may do so using core network information. The following examples will be given with respect to the wireless device 16 determining whether core network functionality 12 provides one or more features of a 5G core network, but are extendable to embodiments in which the wireless device 16 similarly determines whether core network functionality 12 provides one or more features of other core network types/generations.

More particularly in this regard, in an LTE network, when a UE interacts with the core network it connects to a function called the Mobility Management Entity (MME). The MME handles mobility management and session management functions for the UE in LTE network. Corresponding functions may be handled by a new function in 5G, where the 5G core network is referred to as the NextGen Core (NGC) in the following. The NGC may be further subdivided into different functions, e.g., one to handle session management and another to handle mobility management. However, the term NGC will be used for both functions.

In one embodiment, the protocol that is used between the UE and the NGC could be a new protocol, called NG-NAS in the following, or an extension to the existing LTE-NAS protocol. The UE can determine that the NGC supports the new function, based on which library or firmware it uses for the communication. If the UE uses a library, firmware or other code supporting the new function it can deduce that the NGC should support the new function too. The UE can alternatively find an indication of whether the NGC supports the new function from which protocol is being used, e.g. by looking at protocol bits that represent certain information elements only used by a NGC and never by a legacy core network function. Examples of such information elements are protocol version, certain security algorithms or radio configuration parameters used only by NGC.

If the NG-NAS is being used, it indicates that the CN node is an NGC node. If the extension of LTE-NAS is being used, then new procedures or message types specific to 5G or NextGen indicate that the CN node is an NGC node. For example, if network slicing is supported by or used by the core network function, the CN node may use of some form of slice identifiers and/or application of security per slice, per flow, per session. As another example, there may be new security capabilities or network capabilities supported by or used by the core network function, e.g., new types of credentials, privacy enhanced identifiers like encrypted identifiers, pseudonyms, user plane integrity protection, new key sizes and types, 5G key hierarchy, etc. As yet another example, there may be new procedure(s) or message types supported by or used by the core network function, e.g., new types and sizes of subscriber and device identifiers, subscriber authentication procedures like Extensible Authentication Protocol Authentication and Key Agreement (EAP-AKA), certificate based authentication, device authentication procedure, procedures for security configuration and visibility, etc.

Alternatively or additionally, the wireless device 16 may determine whether core network functionality 12 provides one or more features of a first core network type (e.g., 5G) using radio access network information. Again, the following examples will be given with respect to the wireless device 16 determining whether core network functionality 12 provides one or more features of a 5G core network, but are extendable to embodiments in which the wireless device 16 similarly determines whether core network functionality 12 provides one or more features of other core network types/generations.

The radio access network node used in 5G, called gNB in the following, may either be compatible only with the 5G or next generation core network (according to the 5G specifications) or be backwards compatible with LTE core network. If it becomes standardized that the gNB is only connected to the NGC, then determining that the access network node is a new 5G gNB definitely indicates that the core network functionality 12 is a NGC. Otherwise, a gNB only gives a potential indication that the core network functionality 12 is a NGC. In the later case, the potential indication can be taken as a support for other detection techniques, e.g. in the ones described above (using core network information). The wireless device 16 may combine information from several different determination mechanisms to increase the assurance that the core network it is connected to is an NGC. This may lead to false positives, but the assurance level can be raised to a level that makes such sufficiently unlikely to pose a practical problem.

Specific features, e.g. new procedures, and message types used by a gNB when communicating with the UE, could indicate that the radio access network is a gNB, For example, such may be indicated if there is support for or use of network slice, e.g. use of some form of slice identifiers, application of access security per slice, per flow, per session, etc. As another example, such may be indicated if (i) there are new type or size of identifiers, e.g. gNB identifier, cell or cell group identifiers, beam identifiers, etc., (ii) if there are new types of broadcast messages, e.g. new system information block (SIB), new field in the SIBs, etc., (iii) there is use of or indication of new protocols, e.g. medium access control (MAC) MACNR, radio link control (RLC) RLCNR, packet data convergence protocol (PDCP) PDCPNR, radio resource control (RRC) RRCNR, (iv) there are new types of procedures or message types, e.g. new radio or antenna technology, new random access procedure, etc., and/or (v) there is use of or indication of new features, e.g. dual connectivity between LTE and NR, etc.

Irrespective of how the wireless device 16 may determine whether core network functionality 12 provides one or more features of a first core network type (e.g., 5G), the method 300 of FIG. 5 in some embodiments not only includes the wireless device 16 deciding whether to obtain a temporary identifier 18 in accordance with the procedure used by the core network functionality 12 based on that determination, but also includes deciding whether to perform the one or more actions above based on that determination (Block 330 in FIG. 5). For example, in some embodiments, the wireless device 16 may additionally or alternatively perform one or more actions responsive to determining that the core network functionality 12 uses an identifier allocation procedure provided by the second core network type, instead of an identifier allocation procedure provided by the first core network type, and determining that the core network functionality 12 provides one or more features of the first core network type (e.g., responsive to determining that the core network functionality uses a pre-5G identifier allocation procedure even though it provides one or more 5G features). In such a case, then, some embodiments herein include a combination of the method 200 in FIG. 4 and the method 300 in FIG. 5.

In the context of 5G, for instance, when the wireless device 16 knows that a core network node is a 5G core network node, the wireless device 16 may disconnect or otherwise limit its functionality in case the 5G core network node does not use 5G procedures to allocate the temporary identifier 18. Other ways of limiting the functionality are for example to not engage in user plane traffic. Another approach is the wireless device 16 records the fact that the 5G core network node does not use the 5G procedures for allocating the temporary identifier 18. This recorded fact can later be reported to a forum which makes it known. This puts the 5G core network in the situation that if it does not comply with the 5G procedures, devices will disconnect from it, leading to the 5G core network showing terrible performance. This gives an economic incentive for the manufacturer to implement the 5G procedures in the 5G core network, and the mobile network operator to enable their use. One or more embodiments herein thereby provide a technical mechanism for incentivizing core network functionality 12 to implement refreshment of a temporary identifier, e.g., thereby enhancing a user's privacy. Note that the identifier allocation procedure in any of the above embodiments may be any procedure by which the temporary identifier 18 is allocated or refreshed. In some embodiments, for example, refreshment of the temporary identifier 18 may be built into the applicable protocol design (e.g., for 5G), thereby closing doors for poor implementation or poor configuration. Neither the wireless device 16 nor the mobile network can choose not to refresh the temporary identifier 18 without risking interoperability and hence product reputation, thereby, enhancing the privacy.

In this regard, some embodiments herein concern particular approaches by which the core network functionality 12 and the wireless device 16 may each separately generate the temporary identifier 18. In this case, there may be no separate mechanism or configuration needed in the core network to schedule the identifier refreshment. There may be no separate mechanism or configuration needed in the UE to determine if the identifier is refreshed or not.

In one embodiment, all bits of the temporary identifier 18 are generated at each of the core network functionality 12 and the wireless device 16. By contrast, FIGS. 7 and 8 illustrate other embodiments in this regard.

FIG. 7 shows a method 400 performed by a wireless device 16 configured for operation in a wireless communication system 10 that includes core network functionality 12 of a first core network type (e.g., 5G). The method 400 comprises constructing a temporary identifier 18 from a first portion and a second portion (Block 410). The first portion is separately generated by each of the wireless device 16 and the core network functionality 12. The second portion is generated by the core network functionality 12, e.g., and signaled to the wireless device 16. The method 400 also includes using the constructed temporary identifier 18 for communicating with the core network functionality 12 (Block 420). In some embodiments, the wireless device 16 constructs the temporary identifier 18 in this way responsive to determining that the core network functionality 12 is of the first core network type.

FIG. 8 correspondingly shows a method 500 performed by core network functionality 12 of a first core network type. The method 500 includes constructing a temporary identifier 18 from a first portion and a second portion (Block 510). Again, the first portion is separately generated by each of the wireless device 16 and the core network functionality 12. The second portion is generated by the core network functionality 12, e.g., and signaled to the wireless device 16. The method 500 further includes using the constructed temporary identifier 18 for communicating with the wireless device 16 (Block 520).

In some embodiments, constructing the identifier 18 comprises forming the temporary identifier 18 with the second portion as a prefix and the first portion as a suffix of the temporary identifier 18. Only the suffix part is then generated at both the wireless device side and the network side. The prefix part may be made available to the wireless device 16 in a separate message (e.g. broadcast message, separate dedicated message) or in a response message.

In one embodiment, for instance, the prefix includes some bits in the temporary identifier 18 that are used to identify the network or network nodes. For example, in a current LTE system, a 50 bit PREFIX may be constructed using mobile country code (MCC) (12 bits), mobile network code (MNC) (12 bits), MME group identifier (MMEGI) (16 bits), MME code (MMEC) (8 bits), and 2 bits (11). A 30 bit SUFFIX may be formed as the remaining bits in the MME— temporary mobile subscriber identity (M-TMSI), e.g., so as to construct a temporary identifier 18 in the form of a GUTI for LTE. The UE 50 may determine how many bits the SUFFIX has by subtracting the length of PREFIX from the total length of the temporary identifier 18 TEMP_ID (which may be known from the specifications). Or, the network can indicate the SUFFIX size to the UE 50 in a separate message, for example SIB in LTE.

Figure 9:
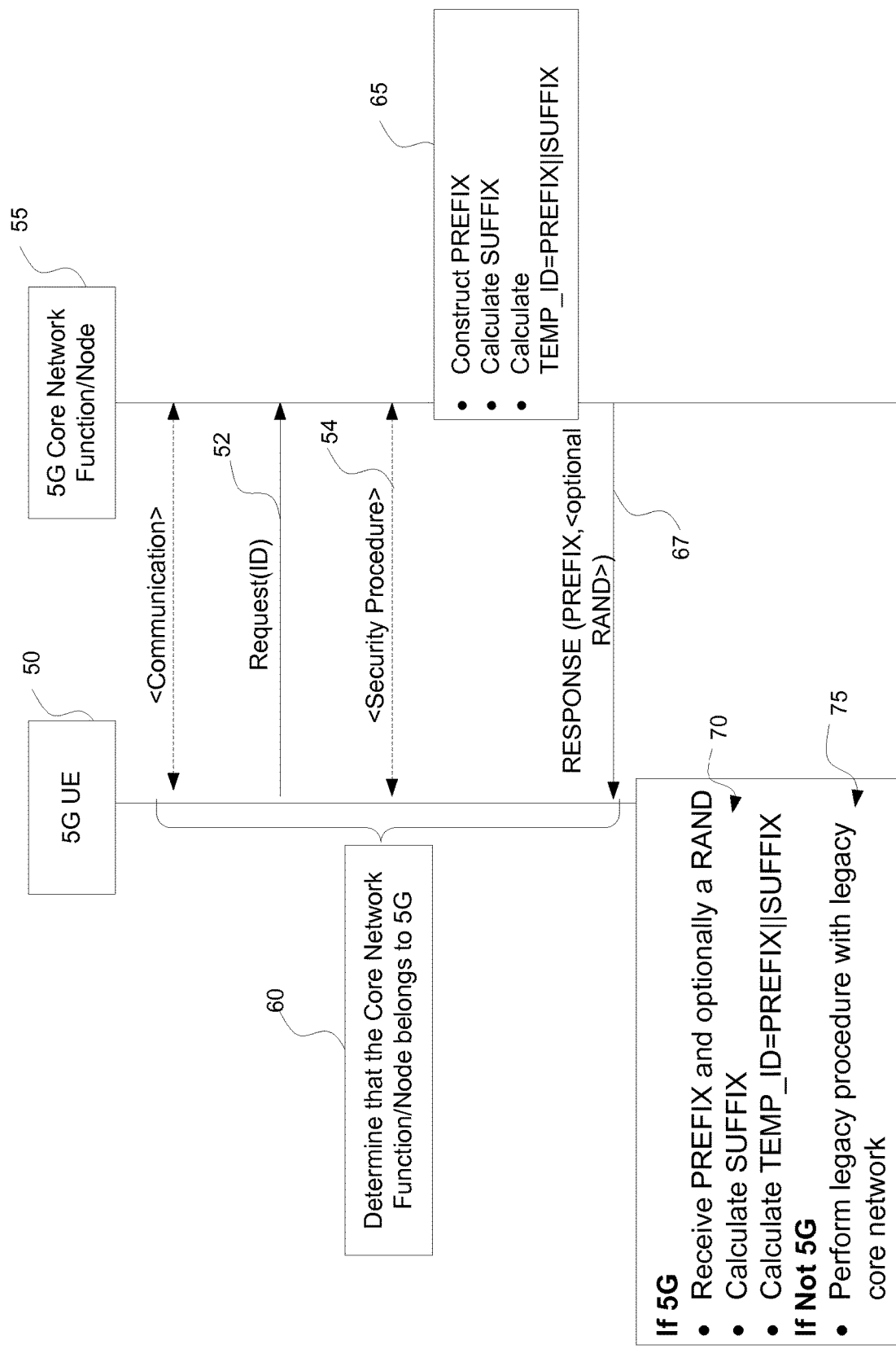
FIG. 9 is a call flow diagram for a wireless device to obtain a temporary identifier according to one or more other embodiments.

FIG. 9 shows an example embodiment. As shown, the wireless device 16 in the form of a 5G UE 50 sends a request message 52 (e.g., an attach request) to 5G core network function or node 55. After an optional security procedure 54, the 5G core network function or node 55 sends a response message 67 to the UE 50. The response message 67 includes a PREFIX to the temporary identifier 18 TEMP_ID that the 5G core network function or node 65 constructed (Block 65). The temporary identifier 18 TEMP_ID is calculated by concatenating this PREFIX with a SUFFIX (Block 65). In some embodiments as shown in FIG. 9, the SUFFIX may in turn be calculated using a random value RAND. When this is the case, the response message 67 may include this RAND.

Accordingly, when the UE 50 determines that the core network function or node 55 belongs to the 5G core network type, the UE 50 in accordance with the 5G identifier allocation procedure receives the response message 67 that includes the PREFIX and optionally the RAND, calculates the SUFFIX, and calculates the temporary identifier 18 by concatenating the PREFIX with the SUFFIX (Block 70). On the other hand, if the UE 50 determines that the core network function or node 55 does not belong to the 5G core network type, the UE 50 performs a legacy identifier allocation procedure (Block 75).

With part of the temporary identifier 18 calculated separately at the wireless device 16 and core network functionality 12, these embodiments provide a mechanism where all the bits of the temporary identifier 18 need not be sent in the signaling messages, thereby allowing radio resources to be saved. That is, the embodiments avoid sending the whole temporary identifier 18 (e.g. GUTI in LTE is 80 bits long) so as to avoid the wireless device 16 occupying greater radio resources.

That said, because of various business or operational or deployment motivations (e.g. implementation optimization, slow evolution of source code, UE and core network evolving at different pace etc.), in some embodiments the core network functionality 12 still has an option to assign the temporary identifier 18 on its own in full to the wireless device 16. That is, in some embodiments, the core network functionality 12 may selectively decide between (i) assigning the temporary identifier 18 in full to the wireless device 16 (e.g., to accommodate the above business, operational, or deployment issues, perhaps at the expense of security or privacy) and (ii) separately generating a portion of the temporary identifier 18 at the wireless device 16 and core network functionality 12. One way, among others, to achieve assignment in full for the PREFIX/SUFFIX embodiments is for the core network functionality 12 to send a PREFIX with the same length as the temporary identifier 18. This means that there are no bits left for the SUFFIX. In other words, the network is implicitly telling the wireless device 16 to use the temporary identifier 18 that is assigned by the network. The wireless device 16 may generally be configured to supplement the PREFIX with a SUFFIX if any remaining bits are left, but to otherwise use the signaled PREFIX if no remaining bits are left. Alternatively, the assignment can be made explicit as well, for example by including some specific message type, or using some specific procedure. In both explicit or implicit cases, though, the wireless device 16 may at least make sure that the newly assigned temporary identifier 18 is not same as the old, (i.e. PREFIX!=old temporary identifier 18).

Still other embodiments herein concern embodiments by which the wireless device 16 and the core network functionality 12 each separately generate the temporary identifier 18. In some embodiments, for example, the temporary identifier 18 in whole or in part is generated using a function and input parameters that are common at the wireless device 16 and the core network functionality 12. In some embodiments, the word "common" should here be read to mean "known to both parties"; the function can be made known for example by being described in a standard specification, a de-facto standard, published by some forum or because both parties are implemented by the same entity that knows the implementation of both parties.

The common parameters may include, among others, a key, a constant value, and a freshness values. The key in some embodiments is for example the one equivalent to a KASME in LTE, which is the root key of the LTE key hierarchy for a given UE, or a key derived from the KASME. The constant value in some embodiments is for example a constant string, e.g. "M-TMSI", which will distinguish the output of the common function, if the common function is used in some other context as well. To ensure that the generated temporary identifier is different each time it is newly generated (at least with high probability) a parameter may be added that changes between the generations. This is the purpose of including a freshness value. The freshness value in some embodiments is for example the one that is available to both the wireless device 16 and core network functionality 12 without requiring transferring the value in an additional field than for normal operation, for example equivalent to a NAS UL or DL COUNT in LTE or an old S-TMSI in LTE. The S-TMSI is transferred for normal operation and therefore does not require an additional field. In case when an explicit freshness value is required, an additional field may be added to a message by the core network functionality 12, for example a RAND that helps generate a fresh temporary identifier with no collision.

The common function may be for example Key Derivation Function (KDF) such as HMAC-SHA-256, a Pseudo Random Function (PRF) such as HMAC-SHA-256, a Pseudo Random Permutation (PRP) such as the Advanced Encryption Standard (AES) in electronic code book mode, or a Pseudo Random Generator (PRG) such as AES in counter mode. However, the term KDF is used in the sequel for simplicity. Any of the other functions will also be appropriate choices. The output of the common function can be truncated as necessary.

In order to minimize radio resource usage, a common parameter known to both the wireless device 16 and the core network functionality 12 is preferable to be used as input to common function (c.f. NAS COUNTs in LTE, which are sequence numbers (sometimes referred to as counters) which are associated with each NAS message and are different for each NAS message protected using the same encryption key; there is one sequence number for uplink messages and one for downlink messages). Doing so will avoid passing the parameter between the wireless device 16 and the core network functionality 12.

Therefore, at first, a temporary identifier 18 is generated using a common parameter, e.g. NAS COUNT, as KDF ($K_{ASME}$, "M-TMSI", NAS UL COUNT) or KDF($K_{ASME}$, "M-TMSI", NAS DL COUNT). If the core network functionality 12 determines that the newly generated identifier is not assigned to another wireless device 16, the core network functionality 12 does not need to send any additional input parameter to the wireless device 16.

But, if the core network functionality 12 detects that the generated identifier is already assigned to another wireless device 16, the core network functionality 12 generates a random value RAND and calculates the identifier using RAND as KDF($K_{ASME}$, "M-TMSI", NAS UL COUNT, RAND), KDF($K_{ASME}$, "M-TMSI", NAS DL COUNT, RAND), or KDF($K_{ASME}$, "M-TMSI", RAND). In such case the core network functionality 12 sends RAND to the wireless device 16. The wireless device 16 sees that RAND is present and will also generate the identifier using RAND instead of NAS COUNT.

The core network functionality 12 may also use an increasing counter instead of the RAND. Note that NAS COUNT, KASME and "M-TMSI" are just example in terms of LTE. Other parameters than those explicitly mentioned may also be input to the KDF. The parameters may be put in a different order than explicitly mentioned. The parameters may be transformed before being input to the function. For example, a set of parameters P1, P2, . . . , Pn, for some non-negative integer n, could be transformed by first being run through a second function f and the result of that, i.e., f(P1, P2, . . . , Pn), being input to the function.

Here is an example of the derivation when the parameter P1 is first transformed before being input to a KDF to calculate a temporary identifier called "ID": ID=KDF(f(P1), some other parameter), where f is some arbitrary function or chain of functions. The input "some other parameter" could be 0, 1 or more other parameters, e.g., used to bind the ID to a certain context. Sometimes, the notation " . . . " may be used as a synonym for "some other parameter". Parameters may be input as separate parameters or may be concatenated together and then input in one single input to the KDF.

As these examples illustrate, therefore, in any of these embodiments, identifier construction may involve forming the temporary identifier with the second portion as a prefix and the first portion as a suffix of the temporary identifier. Alternatively or additionally, the method(s) may comprise generating the first portion using a function and input parameters that are common at the wireless device and the core network functionality. In some embodiments, the second portion comprises one or more codes or identifiers associated with the core network functionality 12. In some embodiments, the second portion is signaled to the wireless device 16 in a broadcast message, a dedicated message, or a response message. In one or more embodiments, a length of the first portion is determined based on a length of the second portion and a length of the temporary identifier to be constructed.

In general, it is possible to trigger the refresh of the temporary identifier 18 after or before or during every protocol procedure. However, the choice of specific communication procedures or messages, that trigger the refreshment of temporary identifier 18, is an important aspect because it is crucial not to introduce unnecessary signaling or computational overheads. Refreshing the temporary identifier 18 for every procedure or message is not necessary, simply because the temporary identifier 18 is not used in every procedure or message. Therefore, it is sufficient that only the procedure(s) or message(s) where the temporary identifier 18 is used are considered. Consider some examples in relation to a current LTE system.

In one example, the temporary identifier 18 is refreshed in the attach procedure. The UE may send an ATTACH REQUEST message to the MME by including either an IMSI or an existing GUTI. After the security context is established between the UE and the MME, the MME sends an ATTACH ACCEPT message to the UE. Instead of the MME including the new GUTI in the ATTACH ACCEPT message, both the UE and the MME separately generate the new GUTI. The new generated GUTI will be used next time, for example in Attach procedure, Paging procedure, or Tracking area updating procedure.

In another example, the temporary identifier 18 is refreshed in the tracking area update (TAU) procedure. The UE sends a TAU REQUEST message to the MME using an existing GUTI. The MME responds with a TAU ACCEPT message to the UE. Instead of the MME including the new GUTI in the TAU ACCEPT message, both the UE and the MME generate the new GUTI. The new generated GUTI will be used next time, for example in Attach procedure, Paging procedure, or Tracking area updating procedure. A TAU procedure is performed when the serving MME changes in an IDLE mode or a CONNECTED mode. Therefore, the scenarios of inter-MME handovers and MME change are covered.

In yet another example, the temporary identifier 18 is refreshed in the Service request procedure. It is not necessary to reallocate GUTI for each service request procedure because the GUTI is not used in the procedure. However, if the UE sends SERVICE REQUEST message to the MME in response to the Paging message, a new GUTI is generated by both the UE and MME. The new generated GUTI will be used next time, for example in Attach procedure, Paging procedure, or Tracking area updating procedure.

In still another example, the temporary identifier 18 is refreshed in the Paging procedure. The MME requests the radio access network to perform Paging by including either an IMSI or an S-TMSI. The S-TMSI is a part of GUTI. If the Paging is performed using an IMSI, the UE performs an Attach procedure. This scenario is covered above. If the Paging is performed using an S-TMSI, the UE performs either a Tracking area updating procedure or a Service request procedure. These scenarios are covered above.

In another example, the temporary identifier 18 is refreshed in the GUTI reallocation procedure. An explicit GUTI reallocation procedure, similar to LTE, may still be useful. However, instead of the MME sending the new GUTI to the UE, a GUTI REALLOCATION COMMAND serves only as an indication to change the GUTI. A new GUTI is generated by both the UE and MME and the newly generated GUTI will be used next time, for example in Attach procedure, Paging procedure, or Tracking area updating procedure.

Figure 10:
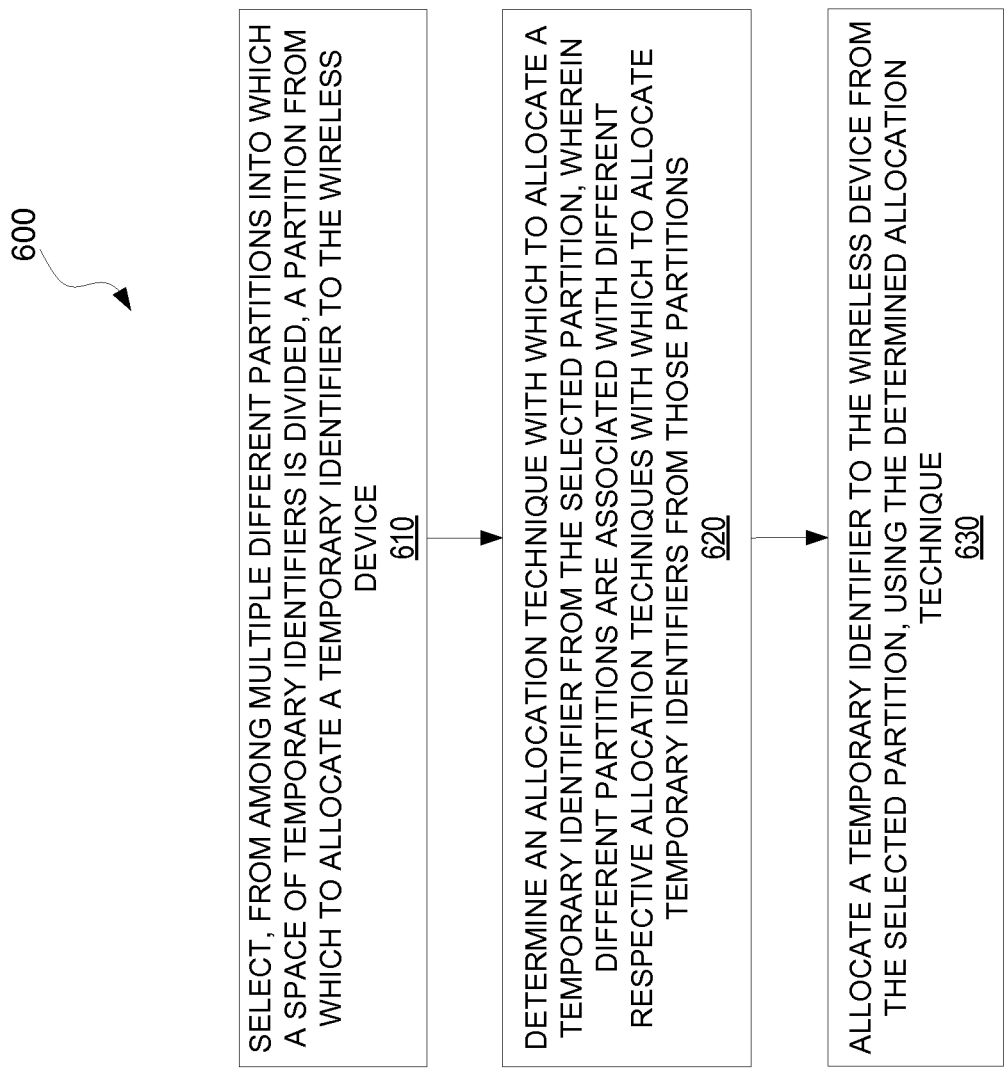
FIG. 10 is a logic flow diagram of a method performed by core network functionality according to other embodiments.

FIG. 10 illustrates still other embodiments herein for a method 600 performed by core network functionality 12 of a wireless communication system 10 for communicating with a wireless device 16. The method 600 includes selecting, from among multiple different partitions into which a space of temporary identifiers is divided, a partition from which to allocate a temporary identifier 18 to the wireless device 16 (Block 610). The method 600 further includes determining an allocation technique with which to allocate a temporary identifier from the selected partition, wherein different partitions are associated with different respective allocation techniques with which to allocate temporary identifiers from those partitions (Block 620). The method also includes allocating a temporary identifier 18 to the wireless device 16 from the selected partition, using the determined allocation technique (Block 630).

According to some embodiments, for example, at least some of the different allocation techniques differ in an extent to which the techniques prevent or mitigate allocation of the same temporary identifier to different wireless devices.

In one embodiment, for instance, the different allocation techniques include a technique to be used for allocating a temporary identifier to a wireless device defined as a low-power device. In this case, according to that technique the core network functionality 12 checks whether a temporary identifier collides with a temporary identifier allocated to other wireless devices before allocating the temporary identifier to the wireless device 16.

In one embodiment, for example, according to the determined allocation technique the core network functionality 12 stores temporary identifiers that are allocated to wireless devices according to that allocation technique in a data structure (e.g., a Bloom filter or a Cuckoo filter). In this case, allocation comprises allocating the temporary identifier 18 to the wireless device 16 if the data structure indicates that the temporary identifier has not been allocated to another wireless device.

Alternatively or additionally, the different allocation techniques may include a technique to be used for allocating a temporary identifier to a wireless device that is not defined as a low-power device. According to that technique the core network functionality 12 relies on a collision recovery mechanism to resolve identifier collisions.

More particularly in the example context of 5G or NG, the space of temporary identifiers may be partitioned in order to efficiently provide different privacy services to different UEs. A 5G core network may know that some UEs are extreme low-power sensors that must reduce power consumption at all costs. These UEs would suffer heavily from additional radio signaling involved in mechanisms for temporary identifier collision recovery. Therefore, the 5G core network may want to have higher assurance against temporary identifiers collisions for those UEs, while still providing strong levels of privacy for the other UEs.

One solution that achieves this is characterized by that: (1) the temporary identifier space is partitioned so that half the space is assigned to the low-power UEs and the other half to the remaining UEs; (2) one bit of each temporary identifier indicates whether the temporary identifier belongs to the first or second partition; and/or (3) the core network functionality 12 verifies that a certain temporary identifier is not already assigned before assigning it to low-power UEs, whereas the core network functionality 12 randomly selects a temporary identifier for other UEs and relies on a collision recovery mechanism when collisions do occur.

Figure 11:
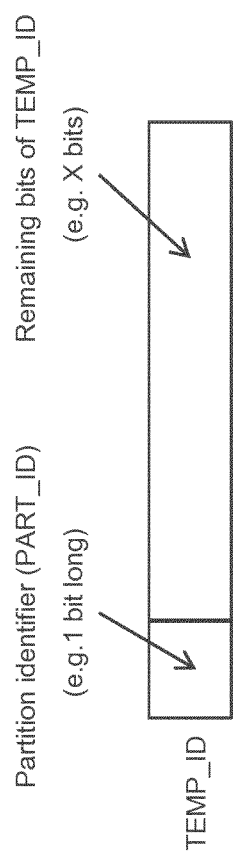
FIG. 11 is a block diagram of a temporary identifier according to some embodiments.

FIG. 11 illustrates one example of a temporary identifier TEMP_ID according to some embodiments. As shown, the temporary identifier TEMP_ID has a first part PART_ID (e.g., one bit long) indicating to which partition the temporary identifier TEMP_ID belongs. The remaining bits of the temporary identifier TEMP_ID (e.g., X bits) may be generated as described above.

Figure 12:
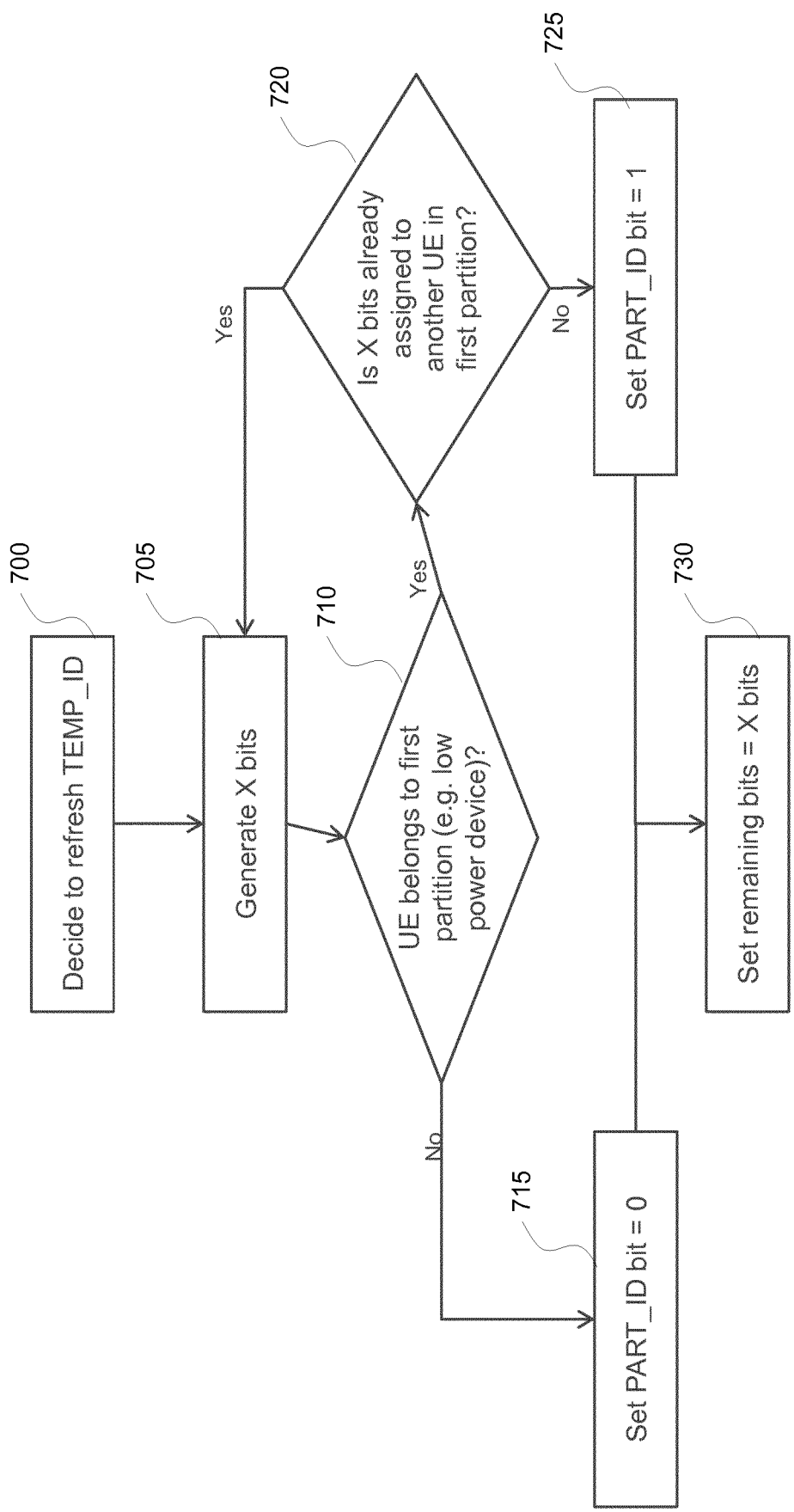
FIG. 12 is a logic flow diagram of a method performed by core network functionality according to still other embodiments.

A general flow chart of the same is shown in FIG. 12. In particular, the core network functionality 12 decides to refresh a UE's temporary identifier TEMP_ID (Block 700). In response, the core network functionality 12 generates X bits (Block 705). The core network functionality 12 then determines whether the UE belongs to a first partition (e.g., associated with low power devices) (Block 710). If not, the core network functionality 12 sets the PART_ID bit to have a value of 0 (Block 715) and sets the remaining bits to the X bits (Block 730). Otherwise, if the UE belongs to the first partition, the core network functionality 12 checks whether the X bits are already assigned to another UE in the first partition (Block 720). If so, then the core network functionality 12 re-generates the X bits (Block 705) and re-checks whether the UE belongs to the first partition (Block 710). If the UE belongs to the first partition and the X bits are not already assigned to another UE in the first partition (Block 720), the core network functionality 12 sets the PART_ID bit to have a value of 1 (Block 725) and sets the remaining bits to the X bits (Block 730).

There are several variations of the characterizing aspects in the above solution. First, the information about which UE belongs to which partition can be obtained in different ways. For example, the information may be obtained from settings similar to the User Subscriber Settings in the Home Subscriber Server (HSS) in today's mobile network, or the core network functionality 12 may deduce this from traffic exchanged with the UE, or the core network functionality 12 may learn it through direct signaling from the UE in the UE's capability list.

Second, the partitioning may not be even, or may contain more than two partitions. Accordingly, the core network functionality 12 may use more than two simultaneous sub-strategies to assign temporary identifiers TEMP_ID for UEs of a given partition.

Third, the core network functionality 12 may not select the temporary identifier TEMP_ID from the second partition (e.g., for non-low-power UEs) randomly, but could select them according to any other scheme, e.g., one described in previous sections.

Fourth, the encoding of the partition identifier (PART_ID) (i.e. an identifier, one bit in above example, pointing to which partition does TEMP_ID belong to) is here exemplified by a single bit in the TEMP_ID, but more elaborate encodings can be envisioned. For example, any bit in the TEMP_ID can be used as indicator. A set of TEMP_ID are publicly known to belong to a partition enjoying a certain handling. These TEMP_ID may be made public, e.g., through a standard specification, a de-facto standard, a broadcast from a base station associated with the core network functionality 12 or being transmitted from the core network functionality 12 to the UE during attach signaling. When more than two partitions are in use, more bits a needed to encode their respective partition identifiers (PART_ID). More complex encodings are also possible; it is possible that the partition identifier (PART_ID) only becomes visible after a decryption operation for example. In this case a UE first decrypts or decodes a field of a message that supposedly comprises the TEMP_ID, and after this step the receiver examines the partition identifier (PART_ID) in the decrypted or decoded TEMP_ID.

Finally, the MME may be satisfied with selecting an TEMP_ID for the first partition (e.g., for low-power UEs), which is only unassigned with a sufficiently high probability. This may for instance be the case if the MME uses a heuristic instead of a fool-proof method to determine which TEMP_IDs it has already allocated to other UEs. An example of a fool-proof method is to go through the list of assigned TEMP_IDs one by one. A heuristic, on the other hand, could be that the MME stores the allocated identifiers in a Bloom-filter or Cuckoo-filter and may thus get false positives when querying the filter regarding the allocation of a given TEMP_ID There are many situations where handling UE's TEMP_ID differently depending on some characteristic of the UE or its subscription is beneficial, e.g., UEs that are low-power, or immobile, or highly mobile, roaming, belonging to a specific subscriber (such as a particular enterprise), UEs belonging to subscriber s having paid premium rates for higher quality services, mission critical or eHealth equipment, or National Security and Public Safety UEs. In general, the embodiments here involve: (1) the TEMP_ID space is partitioned into N partitions; (2) it is deducible from a TEMP_ID to which partition it belongs, possibly after processing using additional information; (3) different strategies for selecting TEMP_ID are associated with the partitions; and/or (4) the MME associates a UE with a partition and assigns the UE TEMP_ID according to the corresponding strategy.

Broadly, then, in some embodiments the partition selecting is performed based on a type of the wireless device, wherein different partitions are associated with different types of devices. Alternatively or additionally, different partitions are respectively associated with devices defined as low-power devices and devices not defined as low-power devices. Alternatively or additionally, selecting is performed based on a subscription of a user of the wireless device, wherein different partitions are associated with different classes of user subscriptions.

In one or more embodiments, at least some of the different allocation techniques differ in an extent to which the techniques prevent or mitigate allocation of the same temporary identifier to different wireless devices. In some embodiments, for example, the different allocation techniques include a technique to be used for allocating a temporary identifier to a wireless device defined as a low-power device, wherein according to that technique the core network functionality checks whether a temporary identifier collides with a temporary identifier allocated to other wireless devices before allocating the temporary identifier to the wireless device. By contrast, in some embodiments, the different allocation techniques include a technique to be used for allocating a temporary identifier to a wireless device that is not defined as a low-power device, wherein according to that technique the core network functionality relies on a collision recovery mechanism to resolve identifier collisions.

In one embodiment, according to the determined allocation technique the core network functionality stores temporary identifiers that are allocated to wireless devices according to that allocation technique in a data structure. In this case, the allocating may comprise allocating the temporary identifier to the wireless device if the data structure indicates that the temporary identifier has not been allocated to another wireless device. This data structure may be for instance a Bloom filter or a Cuckoo filter.

In view of the above modifications and variations, in some 5G embodiments, it shall be mandatory to refresh the core network short-term subscriber identifier during or after certain NextGen NAS (NG-NAS) procedure(s) or NG-NAS message(s). In order not to introduce unnecessary signaling or computational overheads, only those NG-NAS procedure(s) or message(s) shall trigger the refreshment where the short-term identifier is actually used. Some examples of such procedure(s) or message(s) in terms of a current LTE system are attach procedure, tracking area updating procedure, service request procedure in response to the paging message, and paging procedure. An explicit procedure such as the one similar to a GUTI reallocation procedure, in a current LTE system, may also still be useful.

In a variant-A, the UE and the NGC each derive the next short-term identifier from common parameters known to the two parties, e.g., KASME in LTE and a parameter that changes for each derivation, such as the previous short-term identifier. The derivation can be done using, e.g., the KDF. The generated short-term identifier will be used the next time the UE contacts NGC. In this way, neither implementations nor configurations can avoid the refreshment of short-term identifier, thereby enhancing the subscriber's privacy.

The short-term subscriber identifier used in the NGC may have some defined structure, e.g. for routing purposes, and it may not be possible to generate or randomize all the bits of the identifier value. For example, in a current LTE system, a GUTI is constructed using the following fields (3GPP TS 23.003): GUTI=MCC (12 bits)||MNC (12 bits)||MMEGI (16 bits)||MMEC (8 bits)||M-TMSI (32 bits). The first 48 bits, i.e. MCC||MNC||MMEGI||MMEC, uniquely identify the MME that assigned the GUTI. Furthermore, it is also specified that the M-TMSI shall not have a value with all 32 bits equal to 1, and the 2 MSBs of the M-TMSI have special meaning. Hence, there are 30 bits available for any MME for assigning unique identifiers to the UEs that are served by the MME. Therefore, only the part of the identifier that is not a part of a standard structure should be generated separately at the UE side and the NGC side, e.g. 30 bits of the M-TMSI in a current LTE system. The NGC may also need to transfer one of more parts of the identifier to the UE, e.g. MCC, MNC, MMEGI, MMEC and 2 bits of M-TMSI in a current LTE system. The generation of the short-term identifier must be done with care to ensure that the probability of collisions between short-term identifiers allocated to different UEs is sufficiently small. Should there be collisions the NGC will not be able to tell the two UEs apart and would have to resort to a recovery mechanism, e.g., requesting the long-term identifier. It should be noted that the reliability of this mechanism can be brought to the same level as the currently used mechanism in LTE, GSM/GPRS and UMTS. For example, lost messages can be re-transmitted as is done in the LTE NAS protocol.

A UE, communicating with the network, might support both the legacy LTE and the NextGen system, i.e. both a LTE MME and a NGC function. Therefore, in order not to break the legacy mechanism, the UE performs the mandatory refreshment mechanism only with the NGC.

Variant-A changes the short-term identifier per a variable calculation. Therefore, if the NGC does not perform the same calculation, it will not recognize the UE on the next commination between the two, degrading the performance of the NGC. This provides an incentive to adhere to stricter implementation and privacy configuration policy in the NGC.

In another variant-B, the NGC assigns a new short-term identifier to the UE in NGC-NAS messages like in LTE. Some examples of such message(s) in terms of a current LTE system are ATTACH ACCEPT, TRACKING AREA UPDATE ACCEPT, and GUTI REALLOCATION COMMAND. The UE verifies that the newly assigned short-term identifier is a fresh one. If the verification fails, the UE disconnects from the network, refuses to establish a user plane connection or other self-crippling feature.

In Variant-B, the NGC may chose not to renew the short-term identifier. Doing so would result in degraded service for the UEs, since the UEs check whether they are allocated a new short-term identifier or nor.

One could argue that there may be an incentive for UE manufactures not to implement the self-crippling functions. To provide also them with an incentive to implement the UEs in a privacy conscious fashion, it could be added as a feature that is configurable via the UE's user interface.

Despite particular applicability to 5G in some examples, it will be appreciated that the techniques may be applied to other wireless communication systems and core network types.

According to further embodiments herein, a method is performed by a UE communicating with a CN node. The method comprises: deciding to generate a new temporary identifier; determining that the CN node is a NGC node; generating a new temporary identifier; and using the new temporary identifier to identify itself the next time.

Note that the temporary identifier in any of the above embodiments may identify the wireless device in some embodiments (e.g., in terms of a combination of a mobile equipment, ME, and USIM). In other embodiments, the temporary identifier may identifier a user of the wireless device or a user subscription module of the wireless device (e.g., the temporary identifier is a temporary subscriber identifier). Alternatively or additionally, the temporary identifier may identifier a mobile equipment component of the wireless device.

Accordingly, a temporary identifier as used herein may correspond to different identifiers in different generations of mobile networks, even though its purpose may be essentially the same. For instance, in Long Term Evolution (LTE) mobile network a temporary identifier may correspond to the Globally Unique Temporary Identifier (GUTI), S-Temporary Mobile Subscriber Identity (S-TMSI), or M-Temporary Mobile Subscriber Identity (M-TMSI). The M-TMSI is a part of the S-TMSI, whereas the S-TMSI is itself a part of the GUTI. The correspondence of a temporary identifier in 3G or Universal Mobile Telecommunications System (UMTS) and 2G or Global System for Mobile communication (GSM) mobile networks are Temporary Mobile Subscriber Identity (TMSI) or P-Temporary Mobile Subscriber Identity (P-TMSI).

A radio node herein is any type of node (e.g., a base station or wireless communication device) capable of communicating with another node over radio signals. A radio network node is any type of radio node within a wireless communication network, such as a base station. A network node is any type of node within a wireless communication network, whether within a radio access network or a core network of the wireless communication network. A wireless device 16 is any type of radio node capable of communicating with a radio network node over radio signals. A wireless device 16 may therefore refer to a machine-to-machine (M2M) device, a machine-type communications (MTC) device, a NB-IoT device, etc. The wireless device may also be a UE, however it should be noted that the UE does not necessarily have a "user" in the sense of an individual person owning and/or operating the device. A wireless device may also be referred to as a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but are generally configured to transmit and/or receive data without direct human interaction. The terms User Equipment (UE), device, wireless device, mobile, mobile device, phone, mobile phone are used interchangeably to denote a wireless device.

A USIM may be a removable smart-card or a module soldered to a circuit-board in the device or any other physical or logical separate unit from the device.

A logical network function may allocate UE temporary identifiers. In LTE this is the MME, in 2G/3G packet switched it is the serving gateway support node (SGSN), and in 2G/3G circuit switched it is the mobile switching center (MSC). The logical function is discussed in three forms: a legacy core network function, like an MME, an updated/new next generation MME like function and a third term used to denote a core network logical function that can be of any of the two previous types.

Note that the wireless device 16 (e.g., user equipment) as described above may perform the processing herein by implementing any functional means or units. In one embodiment, for example, the wireless device 16 comprises respective circuits or circuitry configured to perform the steps shown in the figures. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 13:
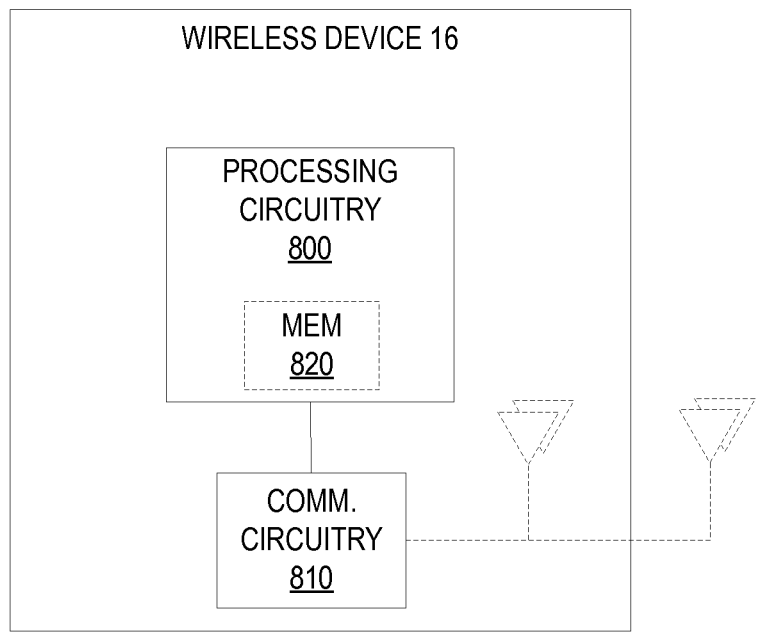
FIG. 13 is a block diagram of a wireless device according to some embodiments.

FIG. 13 illustrates additional details of a wireless device 16 (e.g., user equipment) in accordance with one or more embodiments. As shown, the wireless device 16 includes processing circuitry 800 and communication circuitry 810. The communication circuitry 810 is configured to transmit via one or more antennas. The processing circuitry 800 is configured to perform processing described above, e.g., in any of FIGS. 3-7 and 9, such as by executing instructions stored in memory 820.

Figure 14:
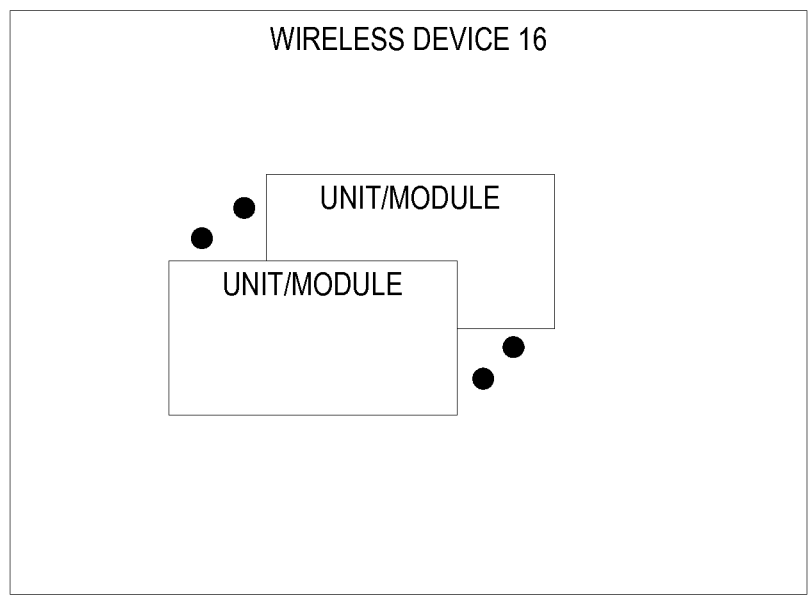
FIG. 14 is a block diagram of a wireless device according to other embodiments.

FIG. 14 shows that the wireless device 16 in some embodiments implements various functional means or units, e.g., via the processing circuitry 800 in FIG. 13. These functional means or units may include different means or units for performing different respective steps in any of FIGS. 3-7 and 9.

Figure 15:
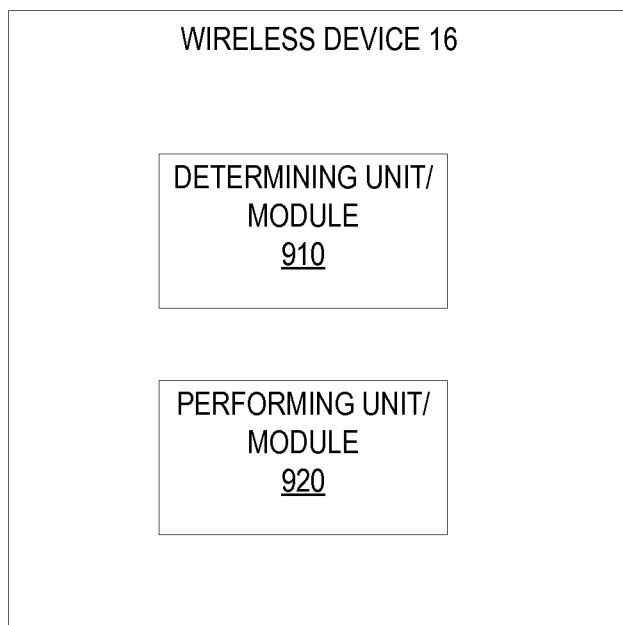
FIG. 15 is a block diagram of a wireless device according to yet other embodiments.

FIG. 15 for example shows the wireless device 16 as including a determining unit or module 910 and a performing unit or module 920. In some embodiments as shown in FIG. 3, the determining unit or module 910 may be for determining whether the core network functionality 12 refreshes the temporary identifier 18 associated with the wireless device 16 in accordance with a defined procedure, and the performing unit or module 920 may be for responsive to determining that the core network functionality 12 does not refresh the temporary identifier 18 in accordance with the defined procedure, performing one or more actions (e.g., as described with respect to FIG. 3). Alternatively, in other embodiments shown in FIG. 4, the determining unit or module 910 may be for determining whether core network functionality 12 of a wireless communication system 10 provides one or more features of a certain core network type and for determining whether the core network functionality 12 uses an identifier allocation procedure provided by the certain core network type in order for the wireless device 16 to obtain a fresh temporary identifier, and the performing unit or module 920 may be for responsive to determining that the core network functionality 12 provides one or more features of the certain core network type, but does not use the identifier allocation procedure provided by the certain core network type, performing one or more actions.

Note also that the core network functionality 12 (e.g., in the form of one or more core network nodes) as described above may perform the processing herein by implementing any functional means or units. In one embodiment, for example, the core network functionality 12 comprises respective circuits or circuitry configured to perform the steps shown in the figures. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 16:
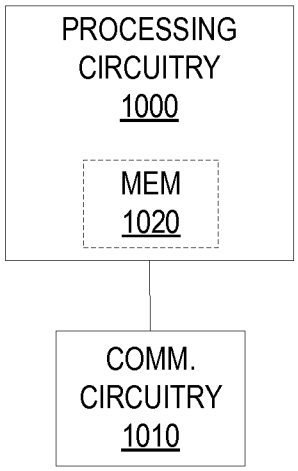
FIG. 16 is a block diagram of core network functionality according to some embodiments.

FIG. 16 illustrates additional details of core network functionality 12 in accordance with one or more embodiments. As shown, the core network functionality 12 includes processing circuitry 1000 and communication circuitry 1010. The communication circuitry 1010 is configured to communicate with the wireless device 16, e.g., via one or more interfaces to or from a radio access network. The processing circuitry 1000 is configured to perform processing described above, e.g., in FIGS. 6 and 8-12, such as by executing instructions stored in memory 1020.

Figure 17:
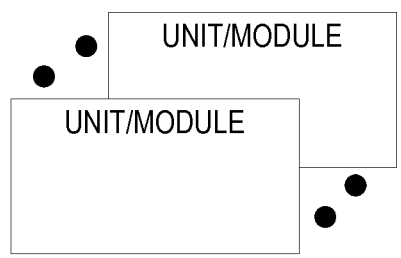
FIG. 17 is a block diagram of core network functionality according to other embodiments.

FIG. 17 shows that the core network functionality 12 in some embodiments implements various functional means or units, e.g., via the processing circuitry in FIG. 16. These functional means or units may include different means or units for performing different respective steps in the above figures.

Those skilled in the art will also appreciate that embodiments herein further include corresponding computer programs.

A computer program comprises instructions which, when executed on at least one processor of a wireless device 16 or core network functionality 12, cause the wireless device 16 or core network functionality 12 to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of a wireless device 16 or core network functionality 12, cause the wireless device 16 or core network functionality 12 to perform as described above.

Embodiments further include a computer program product comprising program code portions for performing the steps of any of the embodiments herein when the computer program product is executed by a computing device. This computer program product may be stored on a computer readable recording medium.

The invention claimed is:

1. A method performed by a wireless device, the method comprising:
   determining that temporary identifier freshness verification by the wireless device failed to verify a temporary identifier received from core network functionality as fresh with respect to a previously received temporary identifier, or that the wireless device has not received a temporary identifier from the core network functionality within a time window since having received a previously received temporary identifier from the core network functionality; and
   responsive to said determining:
      disconnecting the wireless device from the core network functionality;
      terminating or refraining from any service that the wireless device is receiving, or would have received, from the core network functionality;
      refraining from communicating with the core network functionality over a user plane;
      recording at the wireless device that the core network functionality does not refresh a temporary identifier associated with the wireless device; and/or
      reporting the core network functionality as not refreshing a temporary identifier associated with the wireless device.

2. The method of claim 1, wherein said determining comprises determining that temporary identifier freshness verification by the wireless device failed to verify a temporary identifier received from core network functionality as fresh with respect to a previously received temporary identifier according to a defined procedure, wherein the defined procedure is a procedure defined in a 5G wireless communication system for refreshing a temporary identifier associated with a wireless device.

3. The method of claim 1, further comprising:
receiving the temporary identifier from the core network functionality; and
performing temporary identifier freshness verification in an attempt to verify the received temporary identifier as fresh with respect to a previously received temporary identifier;
wherein said determining comprises determining that the performed temporary identifier freshness verification failed to verify the received temporary identifier as fresh with respect to a previously received temporary identifier.

4. The method of claim 1, wherein said determining comprises determining that the wireless device has not received a temporary identifier from the core network functionality within a time window since having received a previously received temporary identifier from the core network functionality.

5. The method of claim 1, comprising disconnecting the wireless device from the core network functionality responsive to said determining.

6. A wireless device comprising:
processing circuitry; and
a memory containing instructions executable by the processing circuitry, wherein execution of the instructions configures the wireless device to:
determine that temporary identifier freshness verification by the wireless device failed to verify a temporary identifier received from core network functionality as fresh with respect to a previously received temporary identifier, or that the wireless device has not received a temporary identifier from the core network functionality within a time window since having received a previously received temporary identifier from the core network functionality; and
responsive to said determination:
disconnect the wireless device from the core network functionality;
terminate or refrain from any service that the wireless device is receiving, or would have received, from the core network functionality;
refrain from communicating with the core network functionality over a user plane;
record at the wireless device that the core network functionality does not refresh a temporary identifier associated with the wireless device; and/or
report the core network functionality as not refreshing a temporary identifier associated with the wireless device.

7. The wireless device of claim 6, said determination comprises a determination that temporary identifier freshness verification by the wireless device failed to verify a temporary identifier received from core network functionality as fresh with respect to a previously received temporary identifier according to a defined procedure, wherein the defined procedure is a procedure defined in a 5G wireless communication system for refreshing a temporary identifier associated with a wireless device.

8. The wireless device of claim 6, wherein execution of the instructions by the processing circuitry configures the wireless device to:
receive the temporary identifier from the core network functionality; and
perform temporary identifier freshness verification in an attempt to verify the received temporary identifier as fresh with respect to a previously received temporary identifier;
wherein said determination comprises a determination that the performed temporary identifier freshness verification failed to verify the received temporary identifier as fresh with respect to a previously received temporary identifier.

9. The wireless device of claim 6, wherein execution of the instructions by the processing circuitry configures the wireless device to determine that the wireless device has not received a temporary identifier from the core network functionality within a time window since having received a previously received temporary identifier from the core network functionality.

10. The wireless device of claim 6, wherein execution of the instructions by the processing circuitry configures the wireless device to disconnect the wireless device from the core network functionality responsive to said determination.

11. A non-transitory, computer-readable medium storing computer-executable instructions that, when executed by processing circuitry of a wireless device, configures the wireless device to:
determine that temporary identifier freshness verification by the wireless device failed to verify a temporary identifier received from core network functionality as fresh with respect to a previously received temporary identifier, or that the wireless device has not received a temporary identifier from the core network functionality within a time window since having received a previously received temporary identifier from the core network functionality; and
responsive to said determination:
disconnect the wireless device from the core network functionality;
terminate or refrain from any service that the wireless device is receiving, or would have received, from the core network functionality;
refrain from communicating with the core network functionality over a user plane;
record at the wireless device that the core network functionality does not refresh a temporary identifier associated with the wireless device; and/or
report the core network functionality as not refreshing a temporary identifier associated with the wireless device.

* * * * *